(12) United States Patent
Tabet et al.

(10) Patent No.: US 11,540,104 B2
(45) Date of Patent: Dec. 27, 2022

(54) DISCOVERY PROCEDURE FOR OFF GRID RADIO SERVICE

(71) Applicant: Apple Inc., Cupertino, CA (US)

(72) Inventors: Tarik Tabet, Los Gatos, CA (US); Lydi Smaini, San Jose, CA (US); Ronald W. Dimpflmaier, Los Gatos, CA (US); Matthias Sauer, San Jose, CA (US); Venkateswara Rao Manepalli, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 260 days.

(21) Appl. No.: 16/850,164

(22) Filed: Apr. 16, 2020

(65) Prior Publication Data

US 2020/0245119 A1 Jul. 30, 2020

Related U.S. Application Data

(63) Continuation of application No. 15/876,582, filed on Jan. 22, 2018, now Pat. No. 10,638,293.

(Continued)

(51) Int. Cl.
*H04L 67/04* (2022.01)
*H04W 4/80* (2018.01)
(Continued)

(52) U.S. Cl.
CPC ............... *H04W 4/80* (2018.02); *H04L 67/04* (2013.01); *H04L 67/1068* (2013.01);
(Continued)

(58) Field of Classification Search
CPC ..... H04L 67/04; H04L 67/1068; H04L 67/12; H04W 4/70; H04W 4/80; H04W 72/121; H04W 76/14; H04W 8/005
See application file for complete search history.

(56) References Cited

U.S. PATENT DOCUMENTS 9,418,372 B2 8/2016 Heerboth
2014/0192735 A1 7/2014 Sridharan
(Continued)

FOREIGN PATENT DOCUMENTS

CN 103108405 5/2013
CN 103686985 3/2014
(Continued)

*Primary Examiner* — Minh Trang T Nguyen
(74) *Attorney, Agent, or Firm* — Kowert, Hood, Munyon, Rankin & Goetzel, P.C.

(57) ABSTRACT

This disclosure relates to techniques for supporting narrowband device-to-device wireless communication, including possible techniques for performing discovery in an off grid radio system. A wireless device may obtain synchronization with a peer-to-peer communication group. The wireless device may determine the location of the wireless device within the peer-to-peer communication group based at least in part on signal strength of a synchronization signal used to obtain the synchronization. The wireless device may perform peer-to-peer discovery in the peer-to-peer communication group, such that time and frequency resources used by the wireless device to perform the peer-to-peer discovery are determined based at least in part on the location of the first wireless device within the peer-to-peer communication group.

20 Claims, 24 Drawing Sheets

Related U.S. Application Data

(60) Provisional application No. 62/559,986, filed on Sep. 18, 2017, provisional application No. 62/543,518, filed on Aug. 10, 2017, provisional application No. 62/464,270, filed on Feb. 27, 2017, provisional application No. 62/462,187, filed on Feb. 22, 2017, provisional application No. 62/449,904, filed on Jan. 24, 2017.

(51) Int. Cl.
| | | |
|---|---|---|
| *H04W 8/00* | (2009.01) | |
| *H04L 67/1061* | (2022.01) | |
| *H04W 76/14* | (2018.01) | |
| *H04W 72/12* | (2009.01) | |
| *H04L 67/12* | (2022.01) | |
| *H04W 4/70* | (2018.01) | |

(52) U.S. Cl.
CPC ............ *H04L 67/12* (2013.01); *H04W 8/005* (2013.01); *H04W 72/121* (2013.01); *H04W 76/14* (2018.02); *H04W 4/70* (2018.02)

(56) References Cited

U.S. PATENT DOCUMENTS

| | | |
|---|---|---|
| 2014/0334354 A1 | 11/2014 | Sartori |
| 2015/0173038 A1* | 6/2015 | Quan .................. H04W 64/00 455/456.5 |
| 2015/0208384 A1 | 7/2015 | Baghel |
| 2015/0270939 A1 | 9/2015 | Ro |
| 2015/0351114 A1 | 12/2015 | Wolf et al. |
| 2016/0065362 A1 | 3/2016 | Choyi et al. |
| 2016/0242221 A1 | 8/2016 | Jung et al. |
| 2016/0262100 A1 | 9/2016 | Larsson |
| 2016/0302250 A1* | 10/2016 | Sheng .................. H04W 4/70 |
| 2016/0323869 A1 | 11/2016 | Xu et al. |
| 2017/0134146 A1 | 5/2017 | Chae et al. |
| 2017/0142741 A1 | 5/2017 | Kaur et al. |
| 2017/0150326 A1 | 5/2017 | Hampel |
| 2017/0238316 A1 | 8/2017 | Li |

FOREIGN PATENT DOCUMENTS

| | | |
|---|---|---|
| CN | 104219758 | 12/2014 |
| CN | 10545361 | 3/2016 |

\* cited by examiner

| NPUSCH Format | $\Delta f$ | $N_{sc}^{RU}$ | $N_{slots}^{UL}$ | $N_{symb}^{UL}$ |
|---|---|---|---|---|
| 1 | 3.75 kHz | 1 | 16 | 7 |
| | 15 kHz | 1 | 16 | |
| | | 3 | 8 | |
| | | 6 | 4 | |
| | | 12 | 2 | |
| 2 | 3.75 kHz | 1 | 4 | |
| | 15 kHz | 1 | 4 | |

DISCOVERY PROCEDURE FOR OFF GRID RADIO SERVICE

PRIORITY INFORMATION

This application is a continuation of U.S. patent application Ser. No. 15/876,582, entitled "Discovery Procedure for Off Grid Radio Service," filed Jan. 22, 2018, which claims priority to U.S. provisional patent application Ser. No. 62/449,904, entitled "Narrowband Device to Device Discovery Communication," filed Jan. 24, 2017, U.S. provisional patent application Ser. No. 62/462,187, entitled "Discovery Procedure for OGRS," filed Feb. 22, 2017, U.S. provisional patent application Ser. No. 62/464,270, entitled "Discovery Procedure for Off Grid Radio Service," filed Feb. 27, 2017, U.S. provisional patent application Ser. No. 62/543,518, entitled "Discovery Procedure for Off Grid Radio Service," filed Aug. 10, 2017, and U.S. provisional patent application Ser. No. 62/559,986, entitled "Discovery Procedure for Off Grid Radio Service," filed Sep. 18, 2017, all of which are hereby incorporated by reference in their entirety as though fully and completely set forth herein.

TECHNICAL FIELD

The present application relates to wireless communication, including to techniques for performing narrowband device-to-device wireless discovery communications.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. Therefore, improvements in the field are desired.

SUMMARY

Embodiments are presented herein of, inter alia, systems, apparatuses, and methods for performing narrowband device-to-device wireless discovery communications.

As noted above, the number of use cases for different classes of wireless devices with widely variable capabilities and usage expectations are growing. While many wireless communication systems primarily utilize infrastructure mode type communications, e.g., in which one or more base stations and potentially a supporting network are used as intermediaries between endpoint devices, one possible use case for wireless communication includes direct device-to-device communications. This disclosure presents various techniques for supporting such communications, including features and techniques for performing device-to-device discovery communications using relatively narrow bandwidth communication channels.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
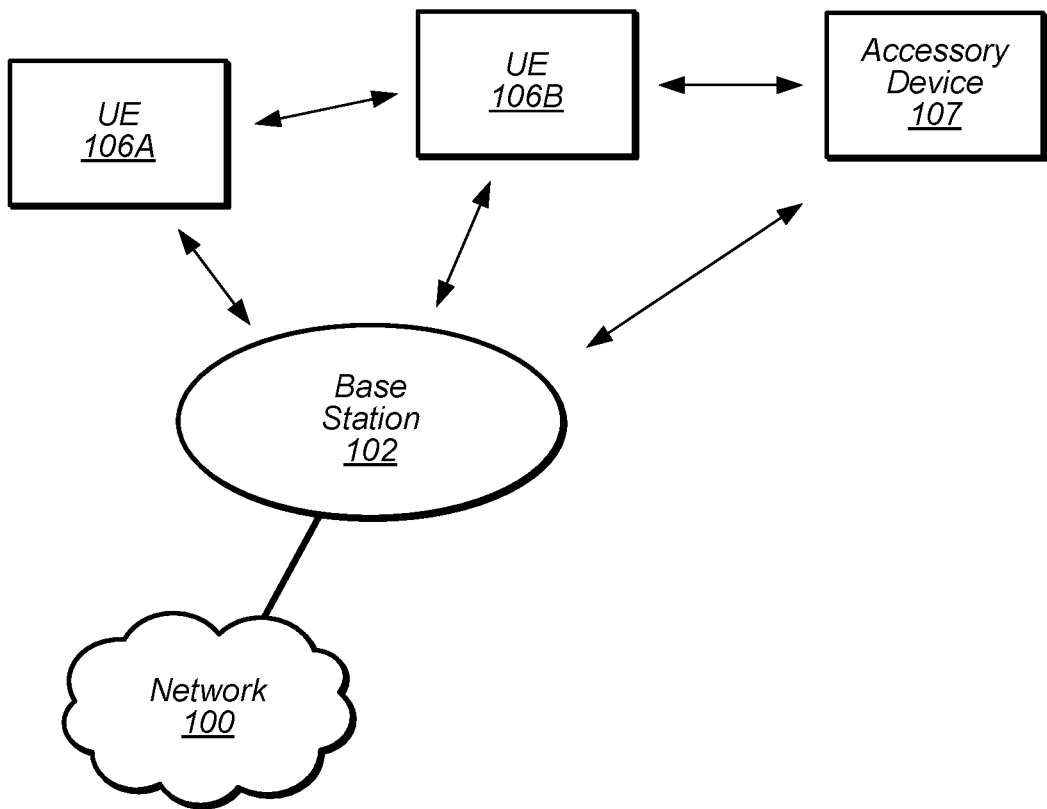
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution
OGRS: Off Grid Radio Service
IoT: Internet of Things
NB: Narrowband
D2D: device-to-device
P2P: peer-to-peer
OOC: out-of-coverage Terminology The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
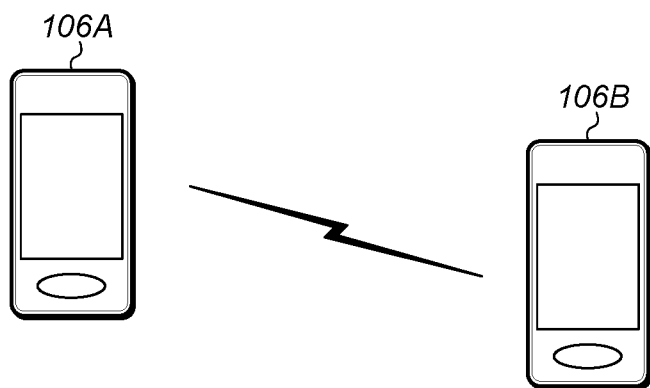
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS- CDMA), LTE, LTE-Advanced (LTE-A), NR, OGRS, HSPA, 3GPP2 CDMA2000 (e.g., 1×RTT, 1×EV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A, NR, OGRS, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, according to at least some aspects of this disclosure, the UE 106A and UE 106B may be capable of arranging and performing narrowband D2D communication (e.g., including narrowband D2D discovery communications) with each other even when out-of-coverage of the BS 102 and other cellular base stations.

FIG. 2 illustrates example UE devices 106A, 106B in D2D communication with each other. The UE devices 106A, 106B may be any of a mobile phone, a tablet, or any other type of hand-held device, a smart watch or other wearable device, a media player, a computer, a laptop or virtually any type of wireless device.

The UEs 106A, 106B may each include a device or integrated circuit for facilitating cellular communication, referred to as a cellular modem. The cellular modem may include one or more processors (processing elements) and various hardware components as described herein. The UEs 106A, 106B may each perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UEs 106A, 106B may include one or more antennas for communicating using two or more wireless communication protocols or radio access technologies. In some embodiments, one or both of the UE 106A or UE 106B might be configured to communicate using a single shared radio. The shared radio may couple to a single antenna, or may couple to multiple antennas (e.g., for MIMO) for performing wireless communications. Alternatively, the UE 106A and/or UE 106B may include two or more radios. Other configurations are also possible.

Figure 3:
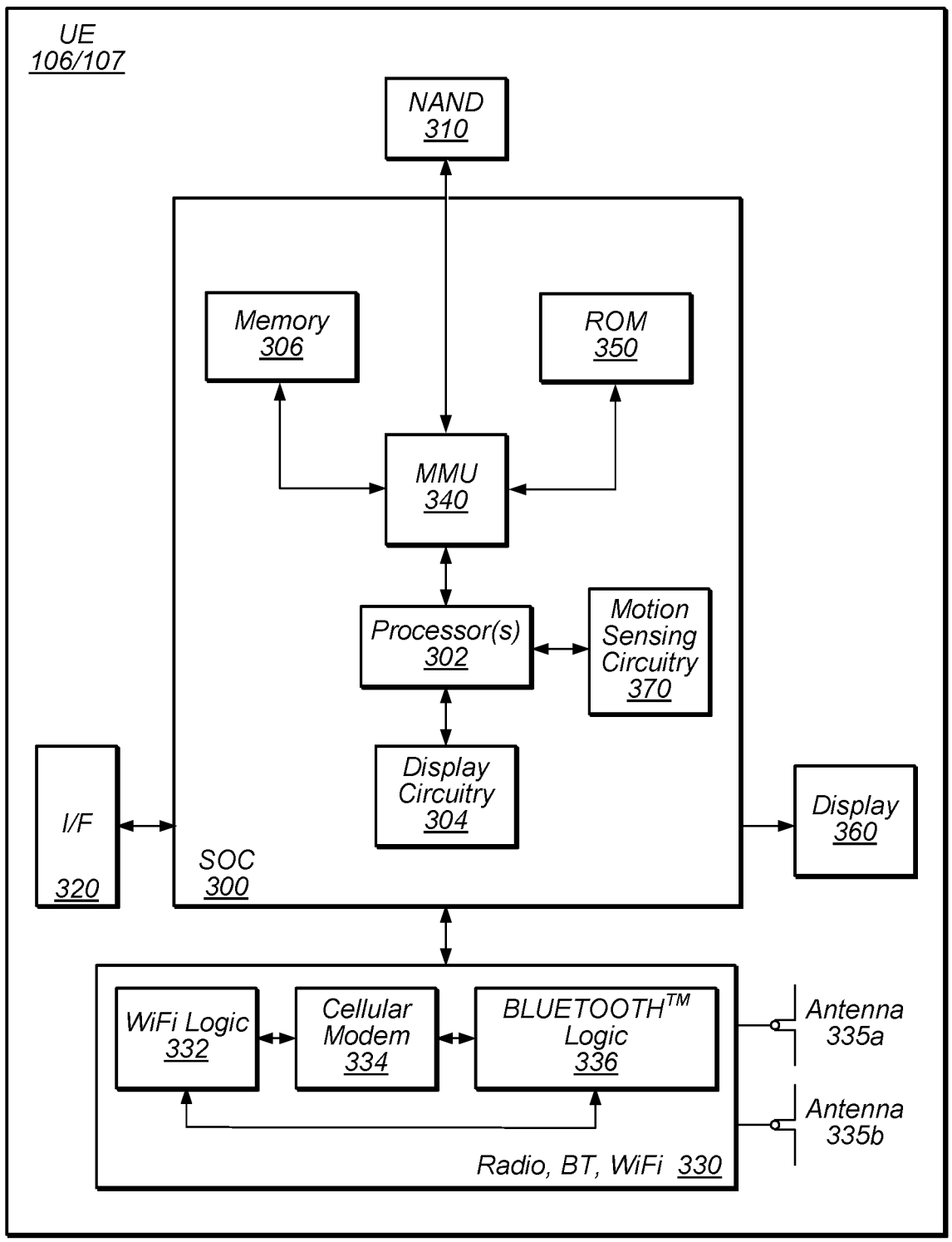
FIG. 3 is a block diagram illustrating an example wireless device, according to some embodiments.

FIG. 3—Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, OGRS, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. For example, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
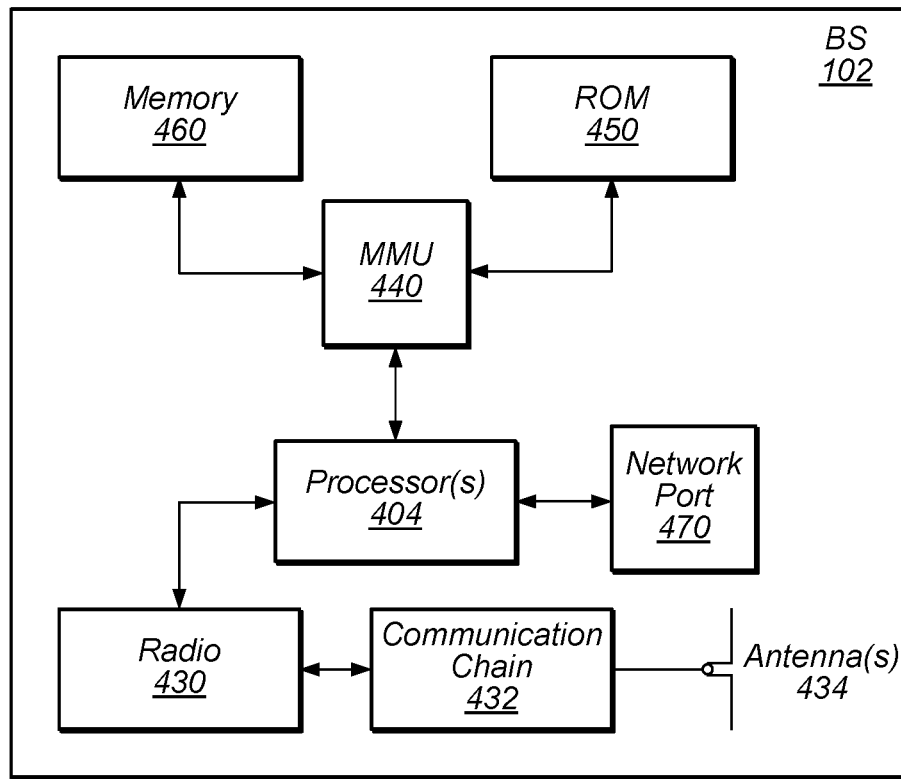
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, OGRS, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. For example, while many of the features described herein relate to device-to-device communication that can be performed by UE devices without relying on an intermediary base station, a cellular base station may be configured to also be capable of performing device-to-device communication in accordance with the features described herein. As another possibility, the BS 102 may be instrumental in configuring a UE 106 to perform narrowband device-to-device communication according to the features described herein, and/or certain features described herein may be performed or not performed by a device based at least in part on whether there is a BS 102 providing cellular service within range of the device. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
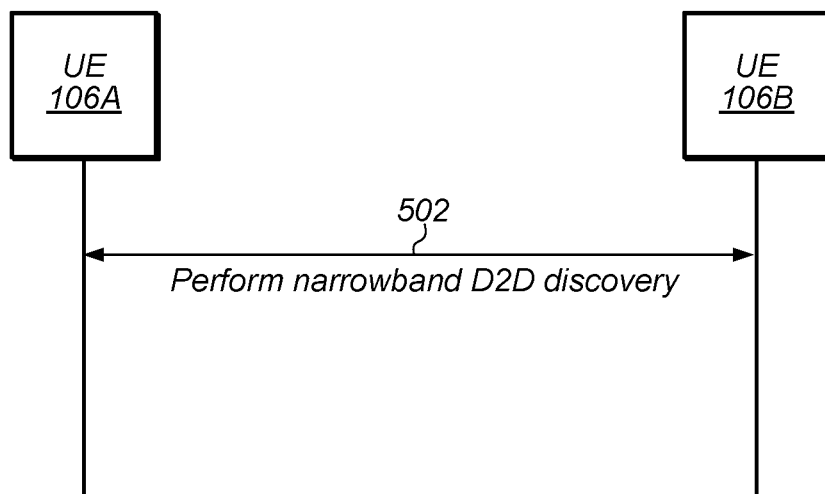
FIG. 5 is a communication flow diagram illustrating an example method for performing narrowband device-to-device wireless discovery communications, according to some embodiments.

FIG. 5—Communication Flow Diagram

FIG. 5 is a communication flow diagram illustrating a method for performing narrowband device-to-device wireless discovery communications, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a wireless device, such as the UEs 106A-B or 107 illustrated in and described with respect to FIGS. 1-3, or more generally in conjunction with any of the computer systems or devices shown in the above Figures, among other devices, as desired. Note that while at least some elements of the method of FIG. 5 are described in a manner relating to the use of communication techniques and/or features associated with LTE, OGRS, and/or 3GPP specification documents, such description is not intended to be limiting to the disclosure, and aspects of the method of FIG. 5 may be used in any suitable wireless communication system, as desired. As shown, the method may operate as follows.

At least two wireless devices may form a device-to-device (D2D)/peer-to-peer communication (P2P) group, such as an OGRS group. This may include a master device transmitting synchronization signals, and any member devices obtaining synchronization to the OGRS group based on receiving the synchronization signals. A master information block (MIB) may also be transmitted by the group master and received by the group members, which may provide additional information such as possible discovery resources, a frequency hopping scheme used for discovery, and/or any of various other information.

In 502, wireless devices of the P2P group, e.g., including UE 106A and UE 106B as shown, may perform narrowband D2D/P2P discovery. The discovery may be performed using one or more Narrowband Internet of Things (NB-IoT) carriers, and/or may be performed using any of various other possible (e.g., narrowband) carriers. The carrier(s) on which discovery is performed may be use a 3.75 kHz and/or 15 kHz subcarrier spacing configuration, according to some embodiments.

According to some embodiments, the P2P discovery may be performed using multiple frequency channels, following a repeating frequency hopping pattern over the course of multiple discovery cycles. Each discovery cycle may include a number of discovery windows, which may be scheduled to allow for the various devices in the P2P group to perform discovery with each other.

For example, a first wireless device (e.g., UE 106A) may transmit a discovery signal (e.g., MSG1) for the first wireless device during a portion (e.g., one resource unit or 'RU') of each discovery window specified for the first wireless device to transmit its discovery signal, while a second wireless device (e.g., UE 106B) may transmit a discovery signal (e.g., also MSG1) for the second wireless device during a portion of each discovery window specified for the second wireless device to transmit its discovery signal. The discovery signals may be transmitted on one or more specified time-frequency resources, e.g., a 'common' subcarrier. The carrier on which the discovery is performed may also include a number of 'dedicated' subcarriers, e.g., of which one may be assigned to each wireless device in the P2P group, based on a device identifier (e.g., UE ID) or on any other desired basis.

The discovery signals may be received by one or more other wireless devices, at least in some instances. For instance, the first wireless device may receive the discovery signal transmitted by the second wireless device, and vice versa.

In some embodiments, the wireless devices may listen to all of the subcarriers of the discovery carrier during portions of the discovery window other than the portion specified for transmitting their discovery signals. A wireless device may thus be able to receive one or more responses (e.g., MSG2) to its discovery signal. The sender(s) of the responses may be in part identifiable based on the dedicated subcarrier(s) on which they are received, e.g., as each wireless device may provide responses using its assigned dedicated subcarrier. Full identification may be based on the content of the MSG2, e.g., that may include a UE_ID (or a derivative of the UE_ID). A wireless device may be able to determine that it is the intended recipient of a response to a discovery signal based partly on when the response is transmitted; for example, according to some embodiments, responses to a discovery signal may generally be provided during a resource unit immediately following a resource unit in which the discovery signal is transmitted. Other possible system resources may additionally or alternatively be specified for providing discovery response indications, according to various embodiments. In other words, according to some embodiments, a transmitting wireless device may be able to specify that it is the sender of a signal based partly on the frequency (subcarrier) of the transmission and may be able to specify which wireless device is the intended recipient of the signal partly based on the time (time slot or resource unit) of the transmission, while a receiving wireless device may conversely be able to determine which wireless device is the sender of a signal partly based on the frequency of the signal and may be able to determine which wireless device is the intended recipient of the signal based on the time at which the signal is received.

Note that the dedicated subcarrier that is assigned to a given wireless device may be selected in any of various ways (e.g., using a hash function based on the UE ID, as one possibility), and at least in some instances (e.g., based on the selection algorithm and/or based on there being a larger number of devices in the P2P group than there are dedicated subcarriers) multiple wireless devices may be assigned the same dedicated subcarrier. In such a case, a wireless device that wishes to respond to another device that is assigned the same dedicated subcarrier may use a dedicated subcarrier that is configured for use for resolving such ambiguous scenarios (e.g., that is different than its assigned dedicated subcarrier) to respond, at least according to some embodiments.

According to some embodiments, the wireless devices may perform spectral shaping of the D2D discovery signals they transmit, e.g., to reduce interference to adjacent subcarriers.

According to some embodiments, a wireless device may repeat its D2D discovery signal on multiple occasions during a discovery window, and/or over multiple discovery windows, wherein the occasions are selected according to a schedule or timing hopping scheme configured to reduce a likelihood of overlapping D2D discovery signal transmission with other wireless devices.

According to some embodiments, the sidelink discovery message comprises a group ID field and a UE ID field.

According to some embodiments, the sidelink discovery message comprises a UE ID field, wherein the sidelink discovery message does not include a group ID field.

According to some embodiments, the D2D discovery signal comprises a code selected as a UE ID from a plurality of orthogonal codes.

According to some embodiments, the code comprises a cyclic shift of a Zadoff-Chu sequence in the frequency domain and a Walsh-Hadamard sequence in the time domain.

According to some embodiments, the wireless device may receive a request for further D2D discovery information from another wireless device, e.g., based on the other wireless device having received the discovery signal transmitted by the wireless device. The wireless device may transmit an additional D2D discovery message in response to the request for further D2D discovery information, wherein the additional D2D discovery comprises additional device identification information provided at a layer higher than the physical layer.

According to some embodiments, a discovery signal may have a predetermined length, and may include an indication of whether the discovery signal is intended to cause all wireless devices in the D2D group to reply or to cause a specific wireless device in the D2D group to reply.

According to some embodiments, when a discovery signal indicates that the discovery signal is intended only for one wireless device, that wireless device may respond to the discovery signal by transmitting control signaling for configuring a data communication channel between the wireless devices, e.g., based at least in part on the indication that the discovery signal is intended only for one wireless device.

According to some embodiments, when a discovery signal indicates that the discovery signal is intended for all wireless devices in the D2D group, each wireless device may respond to the discovery signal by transmitting its device identifier, e.g., based at least in part on the indication that the discovery signal is intended for all wireless devices in the D2D group.

According to some embodiments, a wireless device may determine a transmit power used for responding to a discovery signal, e.g., based at least in part on a received power of the discovery signal and a (e.g., known in advance) transmit power of the discovery signal, and may use the determined transmit power when responding to the discovery signal.

According to some embodiments, a wireless device may provide an indication of the transmit power used when responding to a discovery signal, e.g., to assist the device transmitting the discovery signal with its link adaptation/power control loop. The indication may be explicit or implicit, and may indicate a specific value, a transmit power range, and/or may utilize any of various other techniques for indicating the transmit power.

According to some embodiments, a wireless device may select its transmit power for subsequent communications with a peer device based at least in part on such an indication of the transmit power used by the peer device when responding to the discovery signal of the wireless device.

According to some embodiments, different discovery resources may be specified for different regions and/or power levels of a D2D group, at least during certain portions of a discovery cycle. For example, during certain portions of a discovery cycle, wireless devices near the center of a D2D group may use one communication channel (e.g., one physical resource block or PRB) to perform D2D discovery with other wireless devices near the center of the D2D group, while wireless devices in the outer region of the D2D group may use a different communication channel (e.g., PRB) to perform D2D discovery with other wireless devices in the outer region of the D2D group. Note that determination of whether a wireless device is near the center of the D2D group (e.g., in a cell center region) or in the outer region of the D2D group (e.g., in a cell edge region) may be determined in any of various possible ways. For example, as one possibility, such a determination may be made based at least in part on received signal strength of the synchronization signal with which a wireless device obtains synchronization with the D2D group, e.g., such that if the signal strength is above a signal strength threshold, the wireless device may consider itself to be in the cell center region, while if the signal strength is below the signal strength threshold, the wireless device may consider itself to be in the cell edge region. Note further that any number of locations within the D2D group may be defined, and that the previously described example of two regions (cell center, cell edge) is not intended to be limiting.

During such portions of the discovery cycle, the time-frequency resources used by a given wireless device for transmitting a discovery signal may still be determined based at least in part on a device identifier for the wireless device. The time-frequency resources specified for responding to that discovery signal may also be determined based at least in part on the device identifier for each responding wireless device. For example, resources specified for responding to a discovery signal may be divided among responding wireless devices using time division multiplexing (e.g., all responding devices may respond using the same subcarrier(s) of the specified physical resource block but at different times), or using frequency division multiplexing (e.g., all responding devices may respond during the same temporal resource unit but on different subcarriers of the specified physical resource block). Note that during such portions of the discovery cycle, wireless devices may be able to utilize relatively low power, e.g., since they may be performing discovery with devices that are relatively closeby.

Note further that even if during certain portions of a discovery cycle wireless devices may use different physical resource blocks to perform discovery depending on their location within the D2D group, in order to facilitate discovery between wireless devices at cell center with wireless devices at cell edge, certain portions of the discovery cycle may also be specified in which all wireless devices utilize the same physical resource block for performing discovery. However, if desired, different temporal portions of the time-frequency resources used for discovery in such portions may still be specified for use by wireless devices different locations within the D2D group. Note that during such portions of the discovery cycle, wireless devices may employ relatively high power for transmissions, e.g., since they may be attempting to perform discovery with devices that are relatively far away from each other.

At least according to some embodiments, in order to provide sufficient opportunities for all wireless devices in the D2D group that are within communication range to discover each other, it may be the case that portions of a discovery cycle in which wireless devices use different physical resource blocks to perform discovery depending on their location within the D2D group may alternate with portions of the discovery cycle in which all wireless devices in the D2D group use the same physical resource block to perform discovery.

Thus, in some embodiments, different resources (e.g., time slots and/or physical resource blocks (PRBs)) may be used for devices near the center of a cell relative to devices near the edge of a cell at certain times (e.g., when using low transmission power for discovery), while all such devices may share a set of resources at certain other times (e.g., when using high transmission power for discovery). In some embodiments, different characteristics (e.g., frequency subcarrier spacing and/or message duration) may be provided for communicating discovery signals (which may also be referred to as MSG1s) and discovery response signals (which may also be referred to as MSG2s) during such different portions of a discovery cycle.

For example, according to some embodiments, during portions of a discovery cycle in which wireless devices use different physical resource blocks to perform discovery depending on their location within the D2D group, dedicated resources may be available for both MSG1 and MSG2 (e.g., contention may not be used). For example, a certain number of time slots may be dedicated for MSG1s, and a certain amount of resources may further be dedicated for responses to those potential MSG1s. Thus, whether or not a MSG1 is sent in a first time slot dedicated for a MSG1, no MSG1 can be sent in a second (e.g., immediately following or at some other later) time slot that is set aside for a MSG2 responding to the potential MSG1, even if no MSG1 is actually sent in the first time slot. In other words, the second time slot may be reserved for responses (e.g., MSG2) to a MSG1 in the first time slot. In contrast, according to some embodiments, during portions of a discovery cycle in which all wireless devices use the same physical resource block to perform discovery, contention may be possible, e.g., such that MSG1s or MSG2s may be communicated in any given time slot, and time slots may not be pre-reserved for any particular type of communication. For example, in such a system, it may be the case that if a MSG1 is sent during a given time slot, that may dynamically reserve a following time slot for MSG2s (e.g., for responding to the MSG1), but if no MSG1 is sent during that particular time slot, the following time slot may be available for a MSG1. Such a contention-based system may allow for more flexible (e.g., more efficient) use of resources.

According to some embodiments, dedicated resources for D2D discovery may be provided for MSG1 and MSG2 communications, such as previously described herein, but resources used for MSG3 (e.g., control signaling for link establishment) and MSG4 (e.g., acknowledgement) communications may be dynamically scheduled. In such a case, an indication of the resources to be used for link establishment between devices may be included in either MSG1 or MSG2.

At least according to some embodiments, providing for subdivision of discovery resources according to wireless devices' relative location within a D2D group during at least a portion of each discovery cycle such as described herein may mitigate the near/far problem and/or may reduce the number of collisions between discovery signals. At least in some circumstances, such subdivision may thus reduce latency and/or errors experienced by wireless devices performing narrowband D2D communication.

FIGS. 6-31 and Additional Information

FIGS. 6-31 and the following additional information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure.

At least some existing wireless communication technologies include framework elements for device-to-device communication, also referred to as sidelink communication. For example, the 3GPP standards organization includes D2D/sidelink protocols, e.g, in which in addition to synchronization signals transmitted in the central 6 RBs of the system bandwidth, discovery pool resources, sidelink control channel allocations, and sidelink shared channel allocations may be located in various other (e.g., outer) RBs of the system bandwidth over time. Such sidelink communication performed according to existing D2D protocols may encompass relatively wideband operation, e.g., encompassing at least 6 RBs (e.g., 1.4 MHz) and potentially up to 100 RBs (e.g., 20 MHz).

In at least some instances, however, a more narrowband deployment may be advantageous. For example, for the transmit power regimes of many devices, propagation characteristics for narrowband communications may result in greater range capacity than wider-band communications. Note that effective communication range may be further increased, at least in some instances, if a lower-frequency communication band (e.g., 900 MHz unlicensed spectrum, as one possibility) is used for the narrowband D2D communications. As another possibility, some (e.g., lower complexity) devices may be configured to perform only narrowband communications (e.g., may have RF front end limitations, and/or may have battery limitations functionally limiting capability to perform wider-band communications). As yet another possibility, some devices, even if capable of both wideband and narrowband communication, may prefer to perform narrowband communication when possible, e.g., if the narrowband communication can reduce power consumption by the devices.

Accordingly, features for supporting narrowband (e.g., 180 kHz, as one possibility) D2D communications are described herein, at least according to some embodiments.

The techniques described herein may be used in scenarios when one or more of the communicating wireless devices are not within communication range of a cellular base station (e.g., the devices may be OOS), according to some embodiments. In particular, narrowband D2D discovery mechanisms are included among the features described herein.

Figures 6, 7:
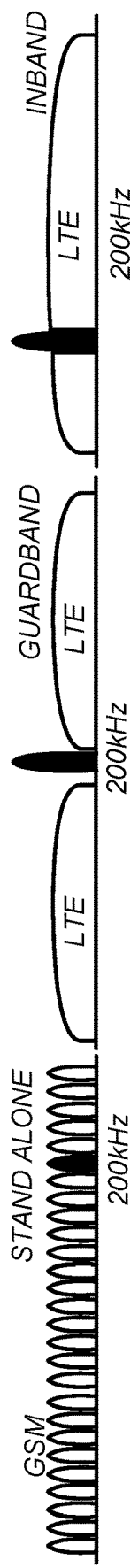
FIG. 6 illustrates various possible example NB-IoT carrier deployment scenarios, according to some embodiments.
FIG. 7 is a table illustrating example uplink numerology and subcarrier spacing possibilities for NB-IoT communication channels, according to some embodiments.

As one possibility for providing the physical narrowband carrier for narrowband D2D communications, a NB-IoT carrier may be used. FIG. 6 illustrates a variety of exemplary possible NB-IoT carrier deployment modes, according to some embodiments. The illustrated deployment modes include standalone deployments (e.g., in a repurposed GSM band), guardband deployments (e.g., in a guardband frequency between LTE carriers), and inband deployments (e.g., within an LTE carrier). In any of these possible deployment modes, NB-IoT carriers may include a variety of key features. For example, among various possible characteristics, NB-IoT carriers may support flexible timelines for control and data channels; peak rates of approximately 20 kbps in the downlink and 60 kbps in the uplink may be supported; single tone (e.g., 3.75 KHz vs. 15 KHz) and multi tone (15 kHz) uplink modulation, using pi/2 binary phase shift keying or pi/4 quadrature phase shift keying may be used (quadrature phase shift keying may also be used in the downlink); single antenna, half duplex frequency division duplexing may be used; and/or a per-UE carrier bandwidth of 180 kHz may be used, according to some embodiments. As further possible example radio access network (RAN)/evolved packet core (EPC) features, NB-IoT carriers may include mandatory data over non-access stratum (DoNAS) support, optional radio resource control (RRC) suspend/resume support, eDRX support, and/or multi-physical resource block (PRB) support, according to some embodiments. Note that for multi-PRB support embodiments, a UE may still operate on one PRB at a time, at least according to some embodiments. Such multi-PRB support may include assignment through RRC signaling and may additionally only be used for inband and guardband deployments, at least in some instances. Frequency hopping features for D2D communications may be supported. In some instances, NB-IoT carriers may provide coverage enchancement features for supporting coverage up to 20 dB.

According to some embodiments, the 'uplink' waveform/transmission characteristics specified for communication on a NB-IoT carrier may be used for narrowband sidelink/D2D communications. FIG. 7 is a table illustrating existing uplink numerology and subcarrier spacing possibilities for NB-IoT communication channels, according to some embodiments. Note that for NB-IoT communications, a new definition of resources may be used, e.g., relative to previously existing LTE communications. For example, a "resource unit" or "RU", defined by a certain number of symbols and slots in the time domain and number of subcarriers in the frequency domain, may be used as a (at least potentially) finer grained denomination than a "resource block" or "RB". With potential subcarrier spacing of 3.75 kHz, it is currently possible that a single tone mode could be used, e.g., such that a UE could be allocated a single subcarrier. As a NB-IoT carrier may encompass a carrier bandwidth of 180 kHz, 3.75 kHz subcarrier spacing may result in 48 subcarriers being available in the frequency domain.

In addition to the possiblility of single tone mode, it is proposed herein to provide the possibility of multi-tone transmission with subcarrier spacing of 3.75 kHz, potentially with variable numbers of slots. For example, a variety of new narrowband physical uplink shared channel (NPUSCH) formats may be used, potentially including $N_{slot}$ values of 1/2/4/8/16. This may allow for more resources to be available for scheduling discovery resources while utilizing 3.75 kHz subcarrier spacing. A 75 μs gap may be available after each slot, which may be in line with sidelink's numerology. This may be useful for timing alignment, e.g., as the gap between slots may be sufficient to allow for devices needing different timing advances to communicate synchronously. Half-duplex communication may also be supported by such a configuration, e.g., as the configured gap between each slot may provide sufficient duration for a wireless device to transition its RF front end from transmit to receive and vice versa.

Note that for 3.75 kHz subcarrier spacing configurations, slot duration may be 2 ms (e.g., to provide equivalent throughput per subcarrier to 15 kHz subcarrier, 0.5 ms slot duration configurations). Each slot may include 7 OFDM symbols. At least in some instances, a longer cyclic prefix may be used in 3.75 kHz subcarrier configurations (e.g., effectively permitted by the longer slot duration), which may increase immunity to delay, spread, and/or timing errors. Thus, 3.75 kHz subcarrier spacing configurations may be useful for a variety of reasons, including potentially with respect to use of short codes as discovery sequences (e.g., as further described subsequently herein). In some instances, 3.75 kHz subcarrier spacing may be used for discovery and initial synchronization (e.g., in which cases the benefits of such a configuration may be more pronounced for such uses), while 15 kHz subcarrier spacing may be used for data/control transmissions (e.g., in which cases the benefits of smaller subcarrier spacing may be more muted and possibly outweighed by beneficial features of larger subcarrier spacing for those use cases, and as subcarrier spacing may have a relatively small overall impact on throughput).

Figure 8:
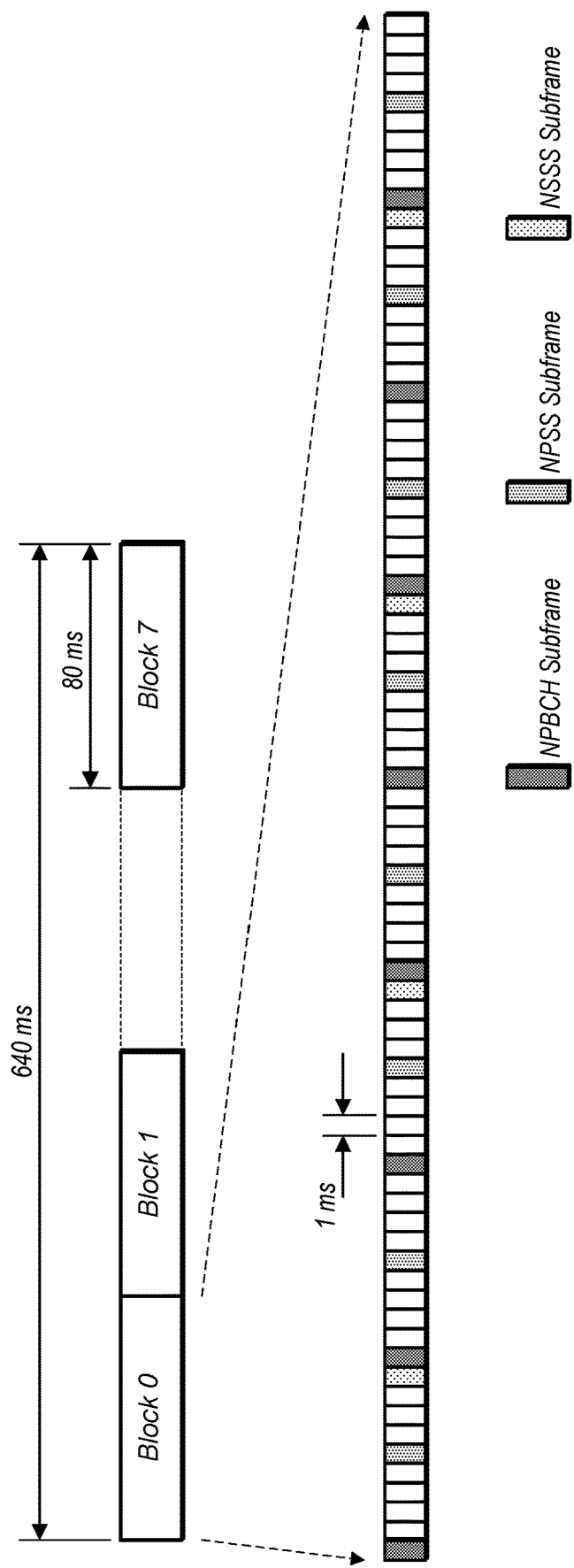
FIG. 8 illustrates a possible example arrangement for synchronization signal cycle timing, according to some embodiments.

FIG. 8 illustrates one possible arrangement for synchronization signal cycle timing, according to some embodiments. The synchronization signals may include narrowband primary synchronization signals (NPSS) and narrow and secondary synchronization signals (NSSS). With smaller subcarrier spacing (e.g., 3.75 kHz vs. 15 kHz or other possible subcarrier spacing), it may be possible to use longer sequences (e.g., with a different Nzc (zadoff-chu sequence) value) for NPSS, with more cyclic shifts and/or more repetitions to improve detection, and/or to generally provide more sequences for neighbor master UEs. Similar characteristics/modifications may also be used for NSSS, if desired.

Figure 9:
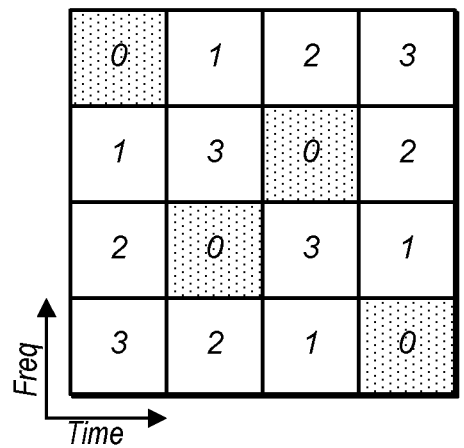
FIG. 9 illustrates a possible example of a hopping sequence in which the frequency resources used for different UEs to transmit discovery signals may hop over time, according to some embodiments.

For narrowband D2D discovery, it may be desirable for the discovery procedure to be relatively robust. Accordingly, at least in some embodiments, the lowest specified NB-IoT modulation (e.g., pi/2 BPSK) may be used. Additionally, a frequency hopping pattern (e.g., a pre-defined pattern) may be used for discovery signals over the entire (or some substantial portion of the) channel bandwidth. For example, frequency hopping may be performed between different 3.75 kHz subcarriers of the 48 such possible subcarriers in a 180 kHz channel. Thus, another potential benefit to using 3.75 kHz subcarrier spacing in narrowband discovery communications may include a larger number of frequencies to hop between when performing frequency hopping (e.g., compared to 12 possible 15 kHz subcarriers in a 180 kHz channel). FIG. 9 illustrates one possible (e.g., simplified) hopping sequence in which the frequency resources used for different UEs to transmit discovery signals may hop over time.

It may further be desirable for the robustness to extend to adjacent channel interference. For example, signals from a transmitting UE may leak to a receiving UE if adjacent subcarriers are used (this may also be referred to as a near/far desensing problem). To counter such problems, there may be a possibility of creating gaps in the frequency domain by using zero (e.g., blank) subcarriers (which may primarily or possibly only be useful when using 3.75 kHz subcarriers, e.g., doing so with wider subcarrier spacing may result in excessive unused resources). Additionally or alternatively, spectral shaping (e.g., using a gaussian filter, as in gaussian minimum shift keying (GMSK)) on top of the modulation may be used to reduce such adjacent channel interference, if desired. Additionally or alternatively, one or more techniques for managing transmit and/or receive power of discovery signals to mitigate near-far problems, such as described further subsequently herein, may be used if desired.

Figure 10:
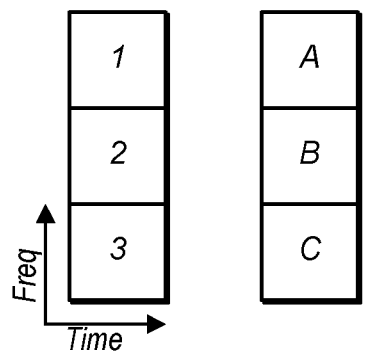
FIG. 10 illustrates an example scenario in which multiple wireless devices transmitting at the same time may not be able to listen to the other's discovery signal transmissions, according to some embodiments.

Due to the half-duplex nature of the NB-IoT communication, while a UE transmits its discovery signal through a discovery resource, it may not be able to listen to, and thus may miss, some other discovery signals transmitted during the same time period. For example, as shown in FIG. 10, if 'UE 1' and 'UE 2' are transmitting discovery signals at the same time, neither may be able to listen to the other's discovery signal transmission.

To counter this to at least some degree, a hopping scheme that minimizes the likelihood that two discovery signals are always transmitted at the same time may be used. For example, a Faro shuffling algorithm may be used to generate such a hopping sequence. In this way, over the course of a discovery period, it may be possible to minimize the likelihood that a wireless device misses every instance of another wireless device's discovery signal transmission.

Figure 11:
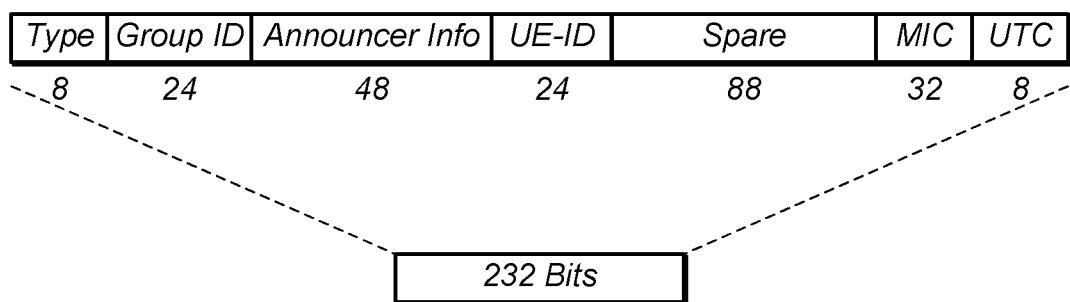
FIG. 11 illustrates an example sidelink discovery message, according to some embodiments.

As one potential arrangement for the payload/discovery message aspect of narrowband D2D discovery signals, the sidelink discovery message (e.g., as defined by the 3GPP sidelink protocol, as illustrated in FIG. 11) may be adapted (e.g., the number of bits may be reduced) to fit in a 180 kHz NB-IoT channel. Multiple UEs' discovery messages may be multiplexed (e.g., in the time domain only, to avoid potential problems arising from missing another UE's discovery signals). As previously noted, at least in some instances pi/2 BPSK modulation may be used for its robust charateristics; additionally, if desired, a 1/3 coding rate may be used. For subcarrier spacing of 3.75 kHz, this may result in 112 bits (e.g., 48*7/3) being available in a given slot. If a single OFDM symbol of a slot is reserved for pilot symbols (e.g., demodulation reference signals or DM-RS), then 96 bits may be available for the discovery message. As one possibility for adapting the sidelink discovery message to this size, only the group ID and the UE ID of the discovery message may be used. 2 UEs per slot could be scheduled to send their discovery message in this arrangement, e.g., as according to the sidelink discovery message illustrated in FIG. 11, each of these fields may include 24 bits. Alternatively, if only the UE ID is sent in the initial discovery message, 4 UEs could be scheduled per slot (e.g., each UE using 24 bits for the UE ID field), and a follow up message could be used to convey the rest of the bits needed for full discovery. Also/alternatively, it could be envisioned that a smaller number of UEs and groups would be supported, in which case (as one non-limiting example) a 12 bit UE ID and a 12 bit group ID might be sufficient. This arrangement may also support scheduling of up to 4 UEs per slot.

Figure 12:
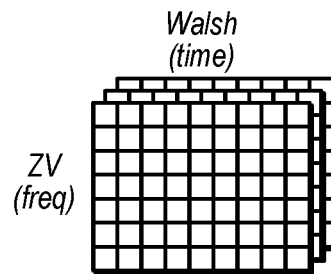
FIG. 12 illustrates an example arrangement of time/frequency resources in which cyclic shifts of Zadoff-Chu sequences are used in the frequency domain and Walsh-Hadamard sequences are used in the time domain, according to some embodiments.

As an alternative arrangement for the payload/discovery message aspect of narrowband D2D discovery signals, orthogonal codes may be used to generate discovery sequences (e.g., each sequence may correspond to a UE ID), e.g., instead of using a modified discovery message based on the discovery message of the 3GPP sidelink protocol. In such a case, as one possibility, cyclic shifts of Zadoff-Chu sequences in the frequency domain along with Walsh-Hadamard sequences in the time domain may be used in combination to provide a substantial number of orthogonal sequences capable of effectively providing shorter UE IDs (or providing a mapping from the 24 bit UE ID to a shorter 9 bit UE ID). FIG. 12 illustrates such an arrangement in time/frequency.

Figure 13:
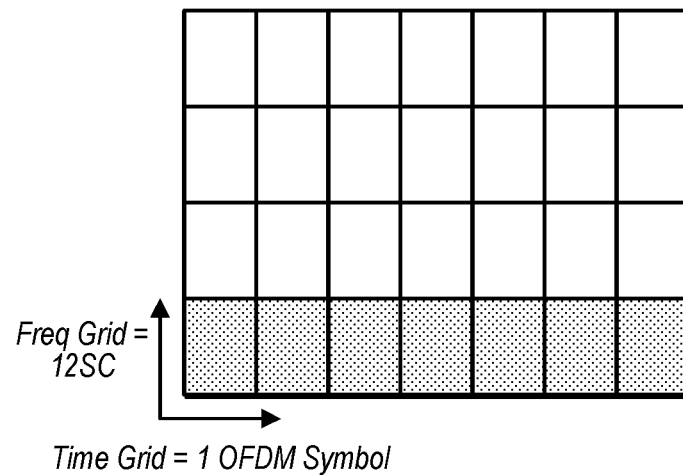
FIGS. 13-14 are time-frequency grids illustrating possible non-frequency hopping and frequency hopping arrangements for providing discovery signals, according to some embodiments.
Figure 14:
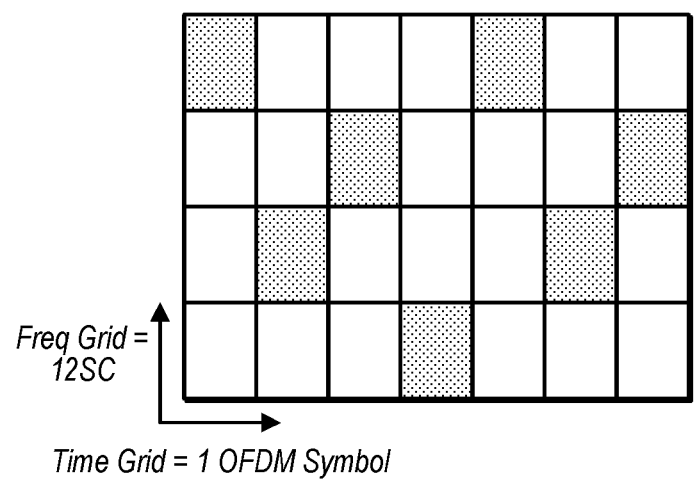

For example, N cyclic shifts of a Zadoff-Chu sequence and an M sequence length Walsh-Hadamard code may be capable of generating up to N×M orthogonal sequences. Thus, as one possibility, a Zadoff-Chu sequence of length 83 that is spread across 7 OFDM symbols may be used. In every OFDM symbol, 12 subcarriers (over the total 48 subcarriers) may be used for each sequence. Such an arrangement is illustrated in FIG. 13. Further, the 12 subcarriers used for a sequence may hop to a different frequency every OFDM symbol, if desired. Such an arrangement is illustrated in FIG. 14. Such hopping may help prevent or reduce the likelihood that two UEs' sequences are adjacent over the whole slot. As every sequence may have a predefined free-time grid, a UE receiving the NB-IoT carrier during a discovery slot may be able to detect 4 UEs during that slot. If a 7 length Walsh-Hadamard sequence is used in combination with the previously given example 83 length Zadoff-Chu sequence, this may provide 581 orthogonal sequences.

If such an orthogonal code based approach is used for initial PHY discovery on the narrowband wireless communication channel, a second (e.g., higher layer) discovery message may also be used, at least in some instances. For example, in such a 2 stage discovery mechanism, the PHY discovery may include detecting the orthogonal sequence (e.g., a code representing a 9 bit UE ID) of a UE, while the high layer discovery may include detecting an announcement message that may contain any of various desired additional information, such as a service offered, a group ID, a longer UE ID if needed, etc.

Note additionally that the codes at PHY could be further classified, if desired. For example, some codes could be reserved for certain classes of device (e.g., wearable device, smartphone, etc.) Thus, depending on the nature of the service desired by a given UE, that UE may decide which device to connect to at least in part based on the code class of a device that it discovers. For example, for a real-time (or time sensitive) message, it might be preferable to connect to a 'smartphone' class of device, according to some embodiments, and such code classifications may facilitate selection of such a device.

As a possibility for minimizing broadcasting of discovery resources (e.g., which may be beneficial for reducing interference and overall resource use in the communication system, and/or for reducing power consumption for individual wireless devices in the communication system), it could be envisioned that a physical random access channel (PRACH) is modified/adapted for use for requesting a discovery message. Thus, once a device discovers a synchronization signal (and a Master UE), it may request from all (or possibly some subset, e.g., based on a PRACH message type) devices in the vicinity to send their discovery messages. A particular slot may be reserved for this PRACH sequence in order for all UEs to be able to receive it.

Off Grid Radio Service (OGRS) is a system that is being developed to provide long range peer-to-peer (P2P)/D2D communication, e.g., in absence of a wide area network (WAN) or WLAN radio connection to support a variety of possible features. At least according to some embodiments, OGRS systems may support some or all of the features previously described herein, such as any of the features or steps of the method of FIG. 5.

According to some embodiments, OGRS may operate in unlicensed low ISM bands, e.g., between 700 MHz and 1 GHz, for extended range purposes, and may use one or multiple carriers of approximately 200 kHz. OGRS may be designed to meet the local spectrum regulatory requirements, such as channel duty cycle, operating frequencies, hopping pattern, LBT, maximum transmit power, and occupied bandwidth.

Any of a variety of features may be included in an OGRS system, including when operating in regulated unlicensed spectrum, such as 900 MHz unlicensed spectrum. For example, frequency hopping spread spectrum (FHSS) may be used. Channel carrier frequencies may be separated by a minimum of 25 kHz, or the 20 dB bandwidth of the hopping channel, whichever is the greater. Channel hopping frequencies may be selected at the system, and/or the hopping rate may be pseudo-random in nature. On average, each channel hopping frequency may be used equally. The receiver bandwidth may match that of the transmitter and may hop in synchronization with the transmitter. A maximum 20 dB bandwidth of the hopping channel may be 500 kHz. If the 20 dB bandwidth is less than 250 kHz, the system may use at least 50 channels. In this case, the average dwell time on a particular channel may not exceed 400 ms within a 20 second period, and/or transmit power may be limited to 30 dBm. If the 20 dB bandwidth is 250 kHz or greater, then the system may use at least 25 channels. In this case, the average dwell time may not exceed 400 ms within a 10 second period, and/or transmit power may be limited to 24 dBm. For example, the following table illustrates a possible set of specified features for OGRS operation depending on the 20 dB bandwidth of the hopping channels used:

| BW | #Channel | TX Power | On Time | Dwell Time |
| --- | --- | --- | --- | --- |
| <250 KHz | >=50 | 30 dBm | 400 ms | 20 sec |
| >250 KHz | <=25 | 24 dBm | 400 ms | 10 sec |

Figure 15:
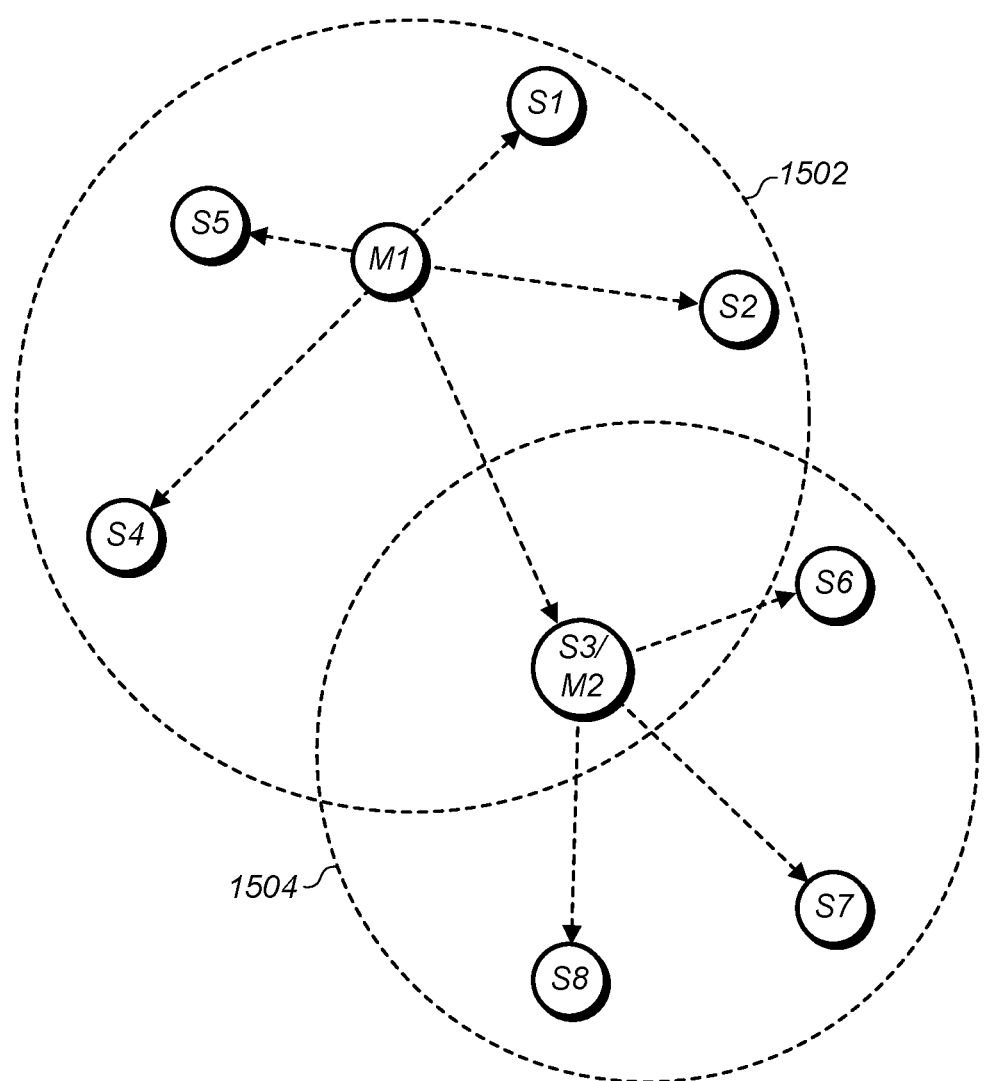
FIG. 15 illustrates aspects of an exemplary possible OGRS communication system, according to some embodiments.

FIG. 15 illustrates aspects of an exemplary possible OGRS communication system, according to some embodiments. As shown, the system may include a first OGRS group 1502 and a second OGRS group 1504. In a given environment, an OGRS group may operate independently, or multiple OGRS groups may co-exist, e.g., as illustrated in FIG. 15. Each of the groups may have a group master and group members; for example, the first OGRS group 1502 may include a 'master' M1, along with several 'slaves' S1, S2, S3, S4, S5. A master in a group may transmit synchronization channels to which other members in the group, and any devices that wish to join the group, may obtain synchronization. For example, the synchronization channel(s) may assist with bringing all the members in the group to a common frequency and time, and may be helpful for the nodes in the group for later communication.

Synchronization can be extended when a particular node in the group is below a threshold, e.g., to facilitate the discovery and serving of new nodes that are beyond the current group's range. For example, node S3 in the first OGRS group 1502 may (e.g., based on distance from M1) determine to establish the second OGRS group 1504 and may act as the master M2 for the second OGRS group 1504, which may be joined by nodes S6, S7, S8, as shown.

Discovery may be a basic functionality for a P2P system, at least according to some embodiments. Accordingly, once synchronization is established, OGRS discovery techniques may be performed for peer discovery and/or service discovery.

As one possibility for satisfying regulations and MCL requirements for long range, according to one set of embodiments, a possible target may include for a peer device in an OGRS system to send a discovery signal every 320 ms. Note that this value is provided as a non-limiting example, and any number of other target values are also possible. In this example, it may be the case that a device may occupy a frequency channel for 4 seconds before hopping to the next frequency channel, and that 5 channels are used for discovery, e.g., such that a device may cycle through the discovery channels every 20 s. The channels used for discovery may be signaled in a master information block (MIB) or could be statically determined (e.g., based on the cell ID found in the synchronization channel, as one possibility).

Figure 16:
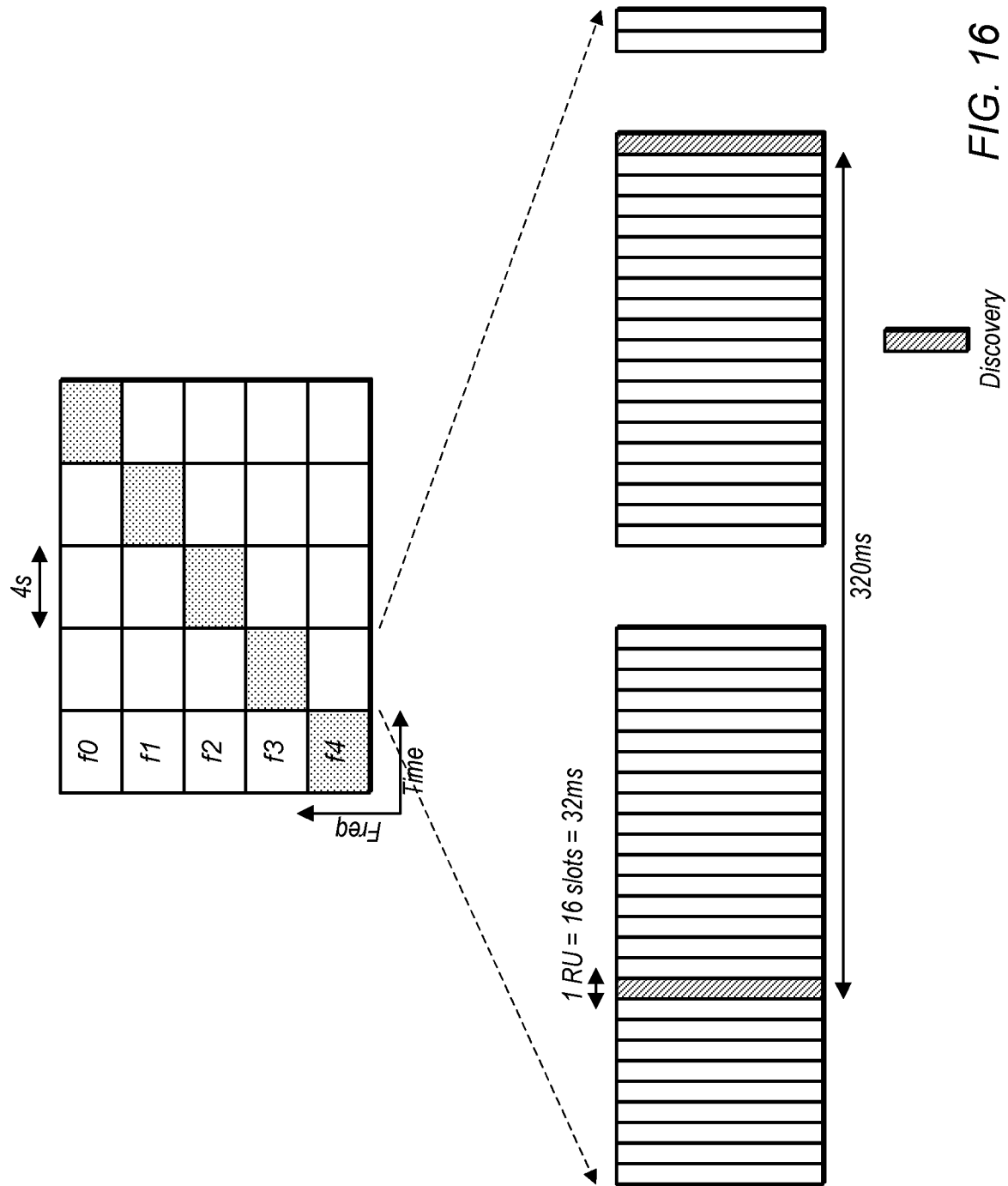
FIG. 16 is a time-frequency grid illustrating a possible frequency hopping arrangement for providing discovery signals in a OGRS system, according to some embodiments.

FIG. 16 illustrates one such possible channel hopping arrangement for OGRS discovery, according to some embodiments. As shown, in the exemplary arrangement each of five frequency channels f0, f1, f2, f3, and f4 may be used for discovery signal transmission for a 4 s portion of each 20 s cycle. It should be noted that in such an arrangement, it may be possible for the various frequency channels used for OGRS discovery for an OGRS group to also be used for discovery (or other purposes) by another OGRS group; for example, while f4 is occupied by a device from a cell ID group (e.g., cell IDs 1 and 2), it may simultaneously be possible for f3 to be occupied by other group of cell IDs. The hopping pattern in frequency channels across time may be cyclic (e.g., from the largest channel ID to the smallest channel ID, or according to any other desired pattern).

According to some embodiments, the OGRS system may specify and/or support half duplex communication by wireless devices. In such a case, in order to enable devices to discover other devices, it may be preferable that only a single device is transmitting a discovery signal per 32 ms discovery message window, such that up to 10 devices may be accommodated for discovery in a discovery window of 320 ms.

The time domain dimension can also be used to accommodate more users. In such a case, the size of the resource unit (RU) used by a device in the 320 ms window can also depend on the device identifier (e.g., UE-ID).

According to some embodiments, for every cell ID, 12 subcarriers, with a spacing of 3.75 kHz, may be reserved for discovery, e.g., with 1 subcarrier as a common subcarrier and 11 subcarriers as dedicated subcarriers. To send their discovery signal ("hello, I am here"), the wireless devices may use the common subcarrier. A slot of 32 ms may be reserved per wireless device, e.g., such that the capacity for a discovery window may be 10 wireless devices. If a larger capacity is desired, the periodicity of the discovery window could be increased (e.g., for 20 users, a periodicity of 640 ms may be used, as one possibility).

Figure 17:
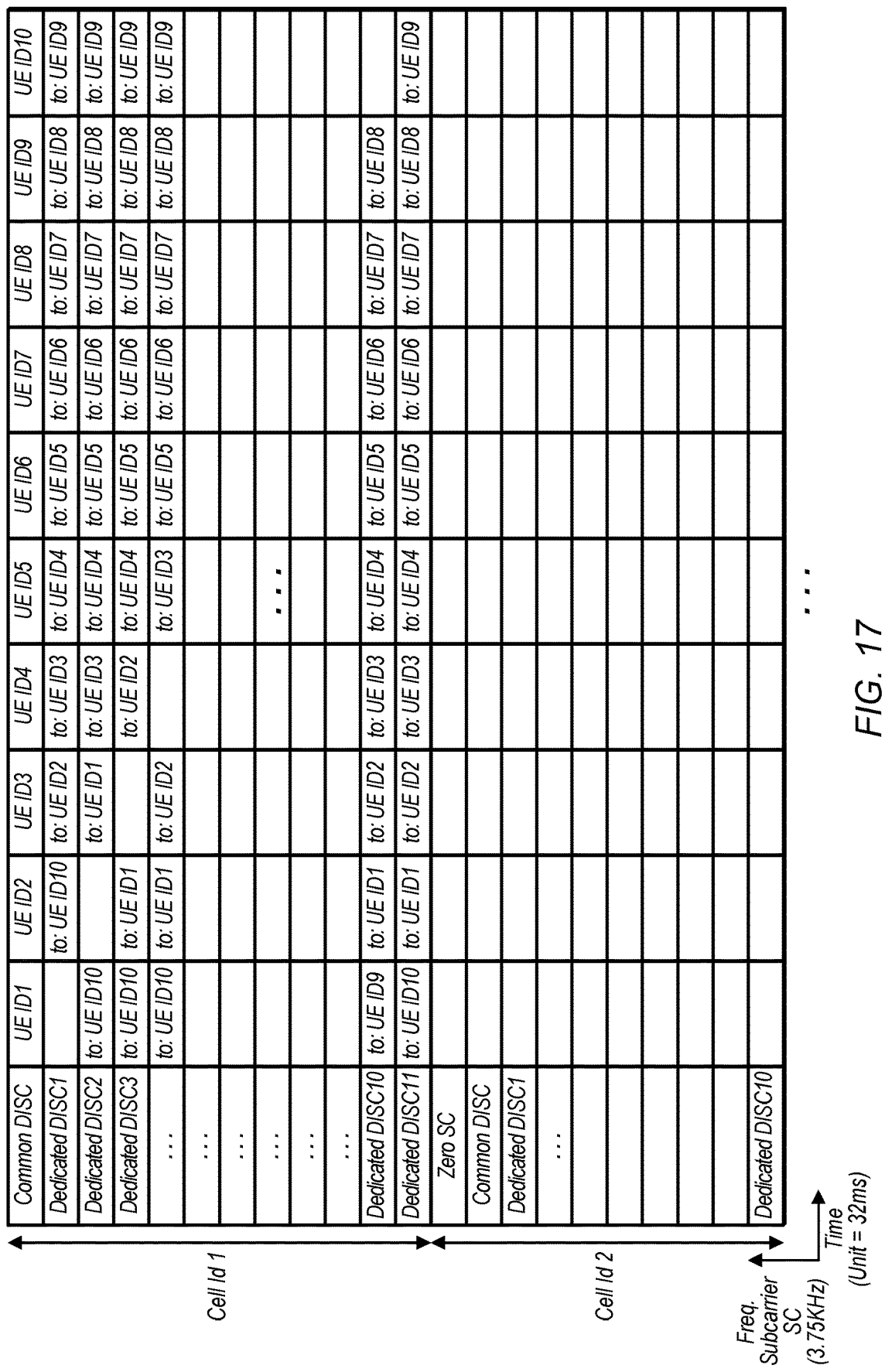
FIGS. 17-18 are time-frequency grids illustrating possible arrangements of common and dedicated subcarriers that may be used according to a possible discovery signal transmission schedule in a OGRS system, according to some embodiments.

FIG. 17 is a time-frequency grid illustrating such a possible arrangement of common and dedicated subcarriers, in which the common subcarrier may be used according to a possible discovery signal transmission schedule, and further illustrating possible responses to the discovery signals using the dedicated subcarriers.

As shown, the dedicated subcarriers may be used for responding to discovery signals, e.g., with each dedicated subcarrier assigned to a device in the group. For example, according to some embodiments, e.g., to avoid collision, as one possibility every UE ID may be assigned a dedicated subcarrier, and a time slot of 32 ms may be used to communicate to every device, such that no collisions should occur provided no more than 10 devices are using the set of discovery resources. Any of various techniques (e.g., a hashing function, as one possibility) may be used to map each device to its assigned dedicated subcarrier.

Additionally, note that a subcarrier may be added (e.g., dedicated subcarrier 11) to resolve any scenarios in which any ambiguity might occur, such as in which a transmitting device and a receiving device have the same dedicated subcarrier. For example, in this case, the receiving UE may use the subcarrier 11 to reply to the discovery message, and may continue to use that subcarrier for the remainder of the discovery process.

Note further that it may be possible to include zero-subcarriers in the resource mapping, e.g., in order to mitigate or avoid any near-far effect problems, such as in which a wireless device is transmitting in a subcarrier while another UE is receiving in an adjacent subcarrier.

Note that a wireless device subject to the half-duplex constraint may be forced to choose between certain activities during certain time units according to the discovery resource schedule illustrated in FIG. 17. For example, according to the resource schedule of FIG. 17, during the time unit immediately subsequent to the time unit in which a UE transmits its discovery signal on the common subcarrier, that UE may be able to receive discovery responses from other UEs in the D2D group, or may be able to transmit a discovery response to the UE that transmitted its discovery signal during the time unit immediately prior to the time unit in which the UE transmitted its discovery signal on the common subcarrier, but not both.

For example, according to some embodiments, if in the preceding time unit, there was a MSG1 transmission, then a UE that wants to initiate a discovery procedure (e.g., transmit its own MSG1) may defer the procedure until a subsequent time, e.g., to avoid interfering with any MSG2 transmissions that may occur in that time unit in response to the MSG1 transmission in the preceding time unit. If there was not MSG1 transmission in the preceding time unit, the UE may proceed to transmit its own MSG1. Thus, it may be possible for the time unit to be used for either of MSG1 or MSG2 transmission, with the UE effectively performing a listen-before-talk mechanism to determine which use of the time unit will occur.

As another possibility, according to some embodiments, for every cell ID, 11 subcarriers, with a spacing of 3.75 kHz, may be reserved for discovery, e.g., with 1 subcarrier as a common subcarrier and 10 subcarriers as dedicated subcarriers. To send their discovery signal, the wireless devices may use the common subcarrier. A slot of 32 ms may be reserved per wireless device, e.g., such that the capacity for a discovery window may be 10 wireless devices. If a larger capacity is desired, the periodicity of the discovery window could be increased (e.g., for 20 users, a periodicity of 640 ms may be used, as one possibility).

Figure 18:
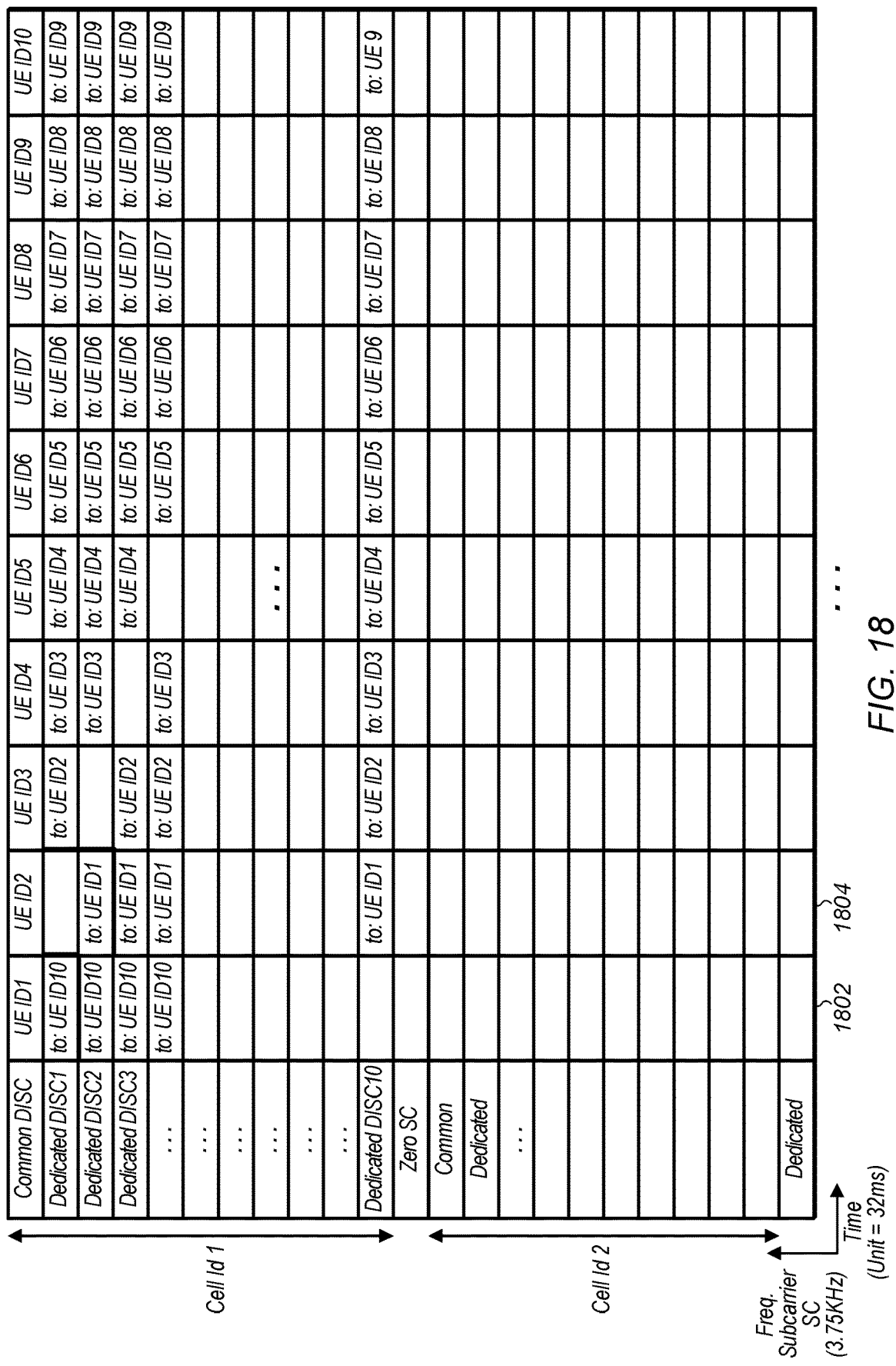

FIG. 18 is a time-frequency grid illustrating such an arrangement of common and dedicated subcarriers, in which the common subcarrier may be used according to a possible discovery signal transmission schedule, and further illustrating possible responses to the discovery signals using the dedicated subcarriers. Note that FIG. 18 accounts for a potential half-duplex constraint in an alternative manner in comparison to FIG. 17.

Similar to the scheme of FIG. 17, the dedicated subcarriers may be used for responding to discovery signals, e.g., with each dedicated subcarrier assigned to a device in the group. For example, according to some embodiments, e.g., to avoid collision, as one possibility every UE ID may be assigned a dedicated subcarrier, and a time slot of 32 ms may be used to communicate to every device, such that no collisions should occur provided no more than 10 devices are using the set of discovery resources. Any of various techniques (e.g., a hashing function, as one possibility) may be used to map each device to its assigned dedicated discovery subcarrier.

As shown (and in contrast to the example shown in FIG. 17), each of the time units (e.g., resource units) may be assigned so that all of the dedicated subcarriers may be used for responding to a single device in the group, according to the time unit. For example, during the first time unit shown (e.g., TU 1802), each of the dedicated subcarriers may be used for messages to UE ID10 (e.g., as denoted by "to: UE ID10"). The arrangement shown in FIG. 18 may allow each time unit to be used for responses (e.g., in the dedicated subcarriers) to the UE that transmitted (e.g., in the common subchannel) in the immediately previous time unit (e.g., in the common subchannel, UE ID10 may transmit immediately before UE ID1, for example in a previous discovery window). Thus, in this case, under the half-duplex constraint, each respective UE may be forced to choose between responding to a discovery signal transmitted by a UE during a time unit immediately previous to a time unit in which the respective UE is scheduled to transmit its discovery signal on the common subcarrier, or transmitting its discovery signal on the common subcarrier. For example, during TU 1804, UE ID2 may either transmit its discovery signal on the common discovery subcarrier, or respond to the discovery signal transmitted by UE ID1 on the common subcarrier during TU 1802, but not both. At least according to some embodiments, a UE may prioritize responding to a discovery signal if one has been transmitted such that a response is requested from the UE, and to transmit its discovery signal only if no such response is requested.

Figure 19:
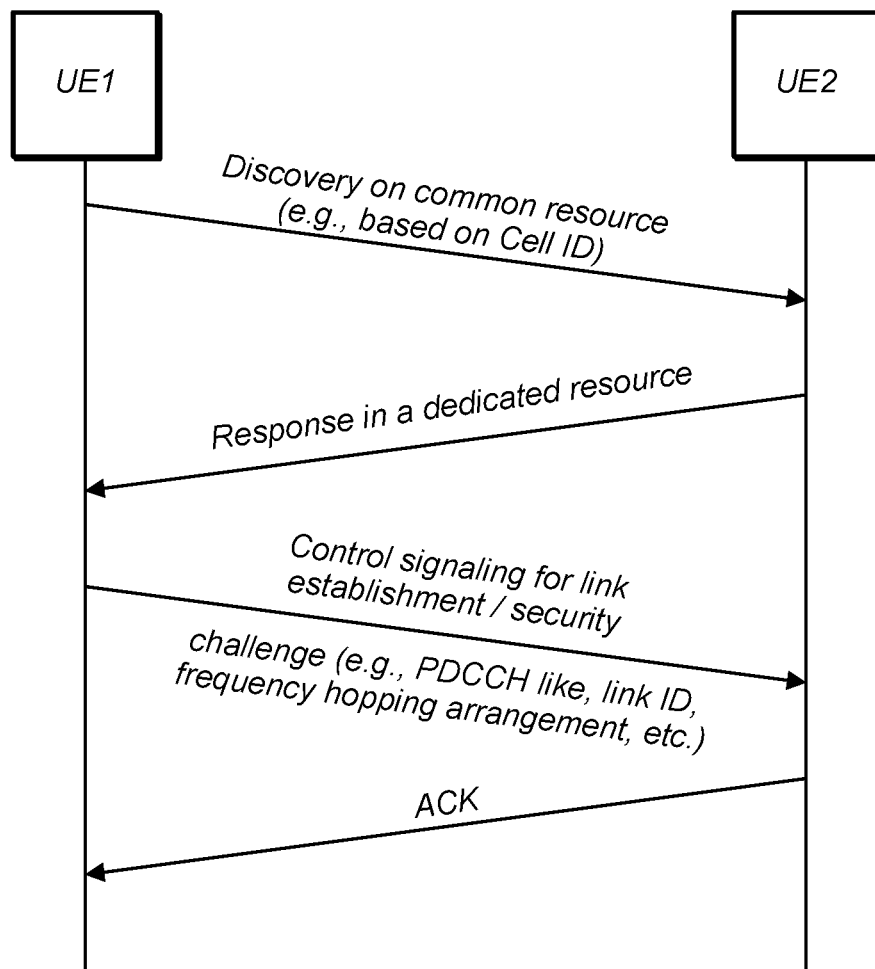
FIGS. 19-21 are communication flow diagrams illustrating various possible discovery signal flows, according to some embodiments.

FIG. 19 is a signal flow diagram illustrating a possible signal flow between a device providing its discovery signal and a device desiring to communicate with the device providing its discovery signal. FIG. 19 may correspond to a first use-case where the UE would like to discover all UEs in the vicinity (e.g., in the cell/group) and/or to communicate with multiple UEs. As illustrated, the transmitting device ("UE1") may provide its discovery signal on the common subcarrier. As one possibility, the discovery signal may be the UE ID (e.g., UE ID1) and may include 32 bits. Once the discovery signal is received by the receiving devices (e.g., including "UE2"), the receiving devices (e.g., including UE2) may use a dedicated subcarrier to respond to the UE1. As one possibility, the response by each receiving device may consist of the UE ID of the receiving device (e.g., UE ID2 in the illustrated example) and may include 32 bits.

The UE1 may receive the response from UE2 (and/or any other responses to its discovery signal from other devices in the D2D group). Based on the response from the UE2, the UE1 may follow up by transmitting control signaling to establish a link between UE1 and UE2. Similarly, the UE1 may follow up with any other UEs that provided discovery responses, and with which the UE1 wishes to establish a communication link. The control signaling may include a security challenge, at least according to some embodiments. The control information may include link ID and/or may specify frequency hopping parameters, among other possibilities. In some embodiments, the control information may include information similar to information that might be included a physical downlink control channel (PDCCH), e.g., according to LTE. The control signaling may be provided using any of various possible resources.

The UE2 may receive the control signaling from the UE1, and may be able to determine that it is from the UE1 and that it is intended for the UE2. The UE2 may in turn provide an acknowledgement to the UE1.

Once the discovery process is complete, the UE1 and the UE2 (e.g., and/or any other UEs that perform discovery in a similar manner, etc.) may perform direct peer-to-peer communication (e.g., using cell resources available for P2P communication).

Figure 20:
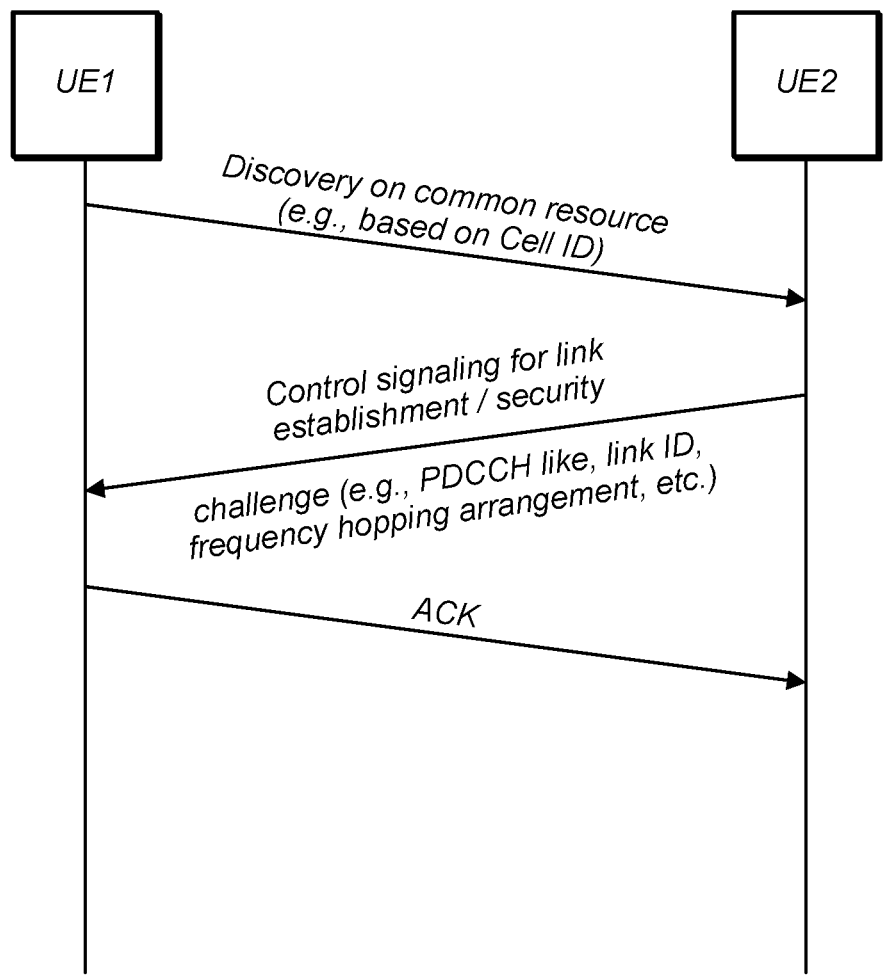

FIG. 20 is a signal flow diagram illustrating another possible signal flow between a device providing its discovery signal and a device desiring to communicate with the device providing its discovery signal. FIG. 20 may correspond to a second use-case wherein the UE would like to perform discovery with and/or to communicate with a single UE. As illustrated, the transmitting device ("UE 1") may provide its discovery signal on the common subcarrier. As one possibility, the discovery signal may include both the UE ID of the source (e.g., UE ID1) and of the destination (e.g., UE ID2). Thus, the size of the message may be 64 bits. This message size may have an impact on the link budget. In some embodiments, the discovery signal may specify additional UE IDs, e.g., multiple destinations.

UE 2 may respond by transmitting control signaling to establish a link between UE1 and UE2. The control signaling may include a security challenge, at least according to some embodiments. The control information may include link ID and/or may specify frequency hopping parameters, among other possibilities. In some embodiments, the control information may include information similar to information that might be included in a PDCCH, e.g., according to LTE. The control signaling may be provided using any of various possible resources.

UE 1 may receive the control signaling from the UE2, and may be able to determine that it is from the UE2. The UE 1 may in turn provide an acknowledgement to the UE 2.

Once the discovery process is complete, the UE1 and the UE2 may perform direct peer-to-peer communication (e.g., using cell resources available for P2P communication).

As noted, according to some embodiments, it may be possible that the initial discovery signal from UE 1 to UE 2 on the common subcarrier in the first use case may have a different length than in the second use case. For example, it may be possible that the length of a discovery message intended for all other UEs may be 32 bits (e.g., the length of the source UE ID) while a discovery signal intended for a single UE may be 64 bits (e.g., the length of the source UE ID plus the length of the destination UE ID). The difference in lengths may create ambiguity for receiving UEs, e.g., UE 2. For example, UE 2 may not be able to accurately decode and determine the content of a variable length message without the benefit of additional information.

Accordingly, in some embodiments, a format for discovery signals of a consistent length may be used to indicate the format intended by the transmitting UE (e.g., UE 1 as illustrated in FIGS. 19-20). For example, such a format may include a single bit (e.g., appended to or as a prefix) configured to provide such an indication in addition to a UE ID; in this example, the discovery signal may be 33 bits in length, as one possibility. An appended bit having a first value (e.g., equal to 1) may indicate that the UE ID in the message is the source UE ID that is transmitted (e.g., UE ID1, in the example illustrated in FIG. 19). This may correspond to the first use case (e.g., described above with respect to FIG. 19) wherein UE 1 would like to discover the presence of all of the UEs around (e.g., in the cell) or communicate with multiple UEs. Further in this example, an appended bit having a second value (e.g., equal to 0) may indicate that the UE ID in the message is the destination UE ID that is transmitted (e.g., UE ID2, in the example illustrated in FIG. 20). This may correspond to the second use case (e.g., described above with respect to FIG. 20), wherein UE 1 would like to communicate with a single UE (e.g., UE 2). Thus, in both use cases, the format and length of the initial discovery signal may be the same. Following the transmission of such a discovery signal, communication in either use case may proceed according to the method of FIG. 19 (e.g., for the first use case) or FIG. 20 (e.g., for the second use case).

Figure 21:
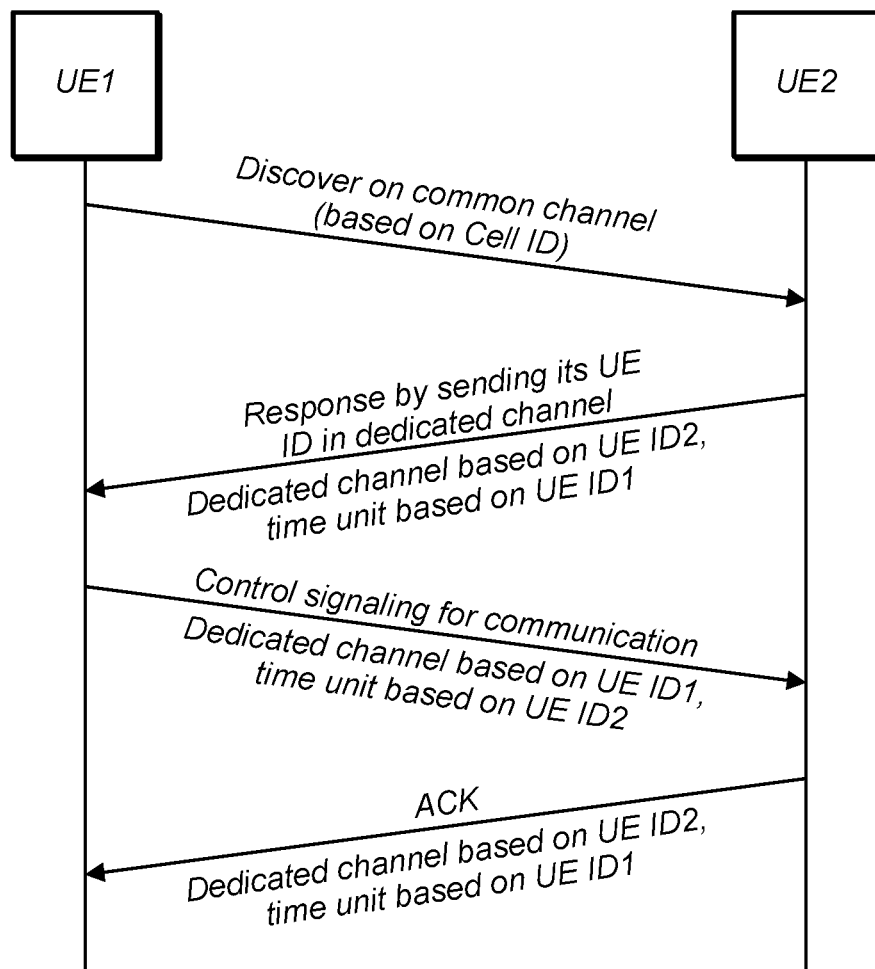

FIG. 21 is a signal flow diagram illustrating a possible signal flow between a device providing its discovery signal and a device desiring to communicate with the device providing its discovery signal, e.g., in a scenario in which the device providing the discovery signal wishes to perform discovery with all devices in the D2D group (e.g., similar to the first use-case illustrated in FIG. 19), further illustrating a possible resource usage framework for the signals exchanged in accordance with the resource scheduling framework illustrated in FIG. 18. As illustrated, the transmitting device ("UE1") may provide its discovery signal. At least according to some embodiments, the discovery signal may include an indication that UE1 wishes to perform discovery with all UEs in this D2D group. Once the discovery signal is received by one of the receiving devices (e.g., "UE2", as shown), and the device is intending to establish communication with the UE1, the UE2 may use a dedicated subcarrier to respond to the UE1. The dedicated subcarrier may be assigned to the UE2 based on its UE ID, and the timing of the response may be based on the timing of the transmission of the discovery signal by UE1. For example, a device may generally indicate that a response is intended for a given device by providing the response during the resource unit immediately following the resource unit when a discovery signal is transmitted. Note that if the responding device is scheduled to transmit its own discovery signal in that resource unit, the responding device may choose between providing its own discovery signal or providing a response during the resource unit in which it is scheduled to transmit its own discovery signal (e.g., according to FIG. 18).

Following transmission of its discovery signal on the single common subcarrier, the UE1 may, during the subsequent resource unit, receive all (e.g., 11) discovery subcarriers, e.g., including a discovery signal from the next scheduled device and any responses to its discovery signal (e.g., potentially including the response from UE2 and/or any other responses to its discovery signal on dedicated subcarriers assigned to other devices). Based on the response from the UE2, the UE1 may follow up with control signaling to establish communication between UE1 and UE2. The control signaling may be provided using the dedicated subcarrier assigned to UE1, and may be provided in a time unit selected based on the control signaling being intended for UE2 (e.g., during a resource unit immediately subsequent to a resource unit in which the UE2 provides its discovery signal, or another resource unit scheduled for messages intended for UE2).

The UE2 may receive the control signaling from the UE1, may be able to determine that it is from the UE1 based on the subcarrier in which the control signaling is received, and may be able to determine that it is intended for the UE2 based on the timeslot in which the control signaling is received. The UE2 may in turn provide an acknowledgement to the UE1, e.g., similarly using a dedicated subcarrier assigned to the UE2 and using a time unit intended to indicate that the UE1 is the intended recipient.

Once the discovery process is complete, the UE1 and the UE2 may perform direct peer-to-peer communication (e.g., using cell resources available for P2P communication).

Note that a similar resource usage framework, e.g., in accordance with the resource scheduling framework illustrated in FIG. 18, may also or alternatively be used for the signals exchanged when performing discovery with a single other device (e.g., according to the second use-case illustrated in FIG. 20), if desired.

Figure 22:
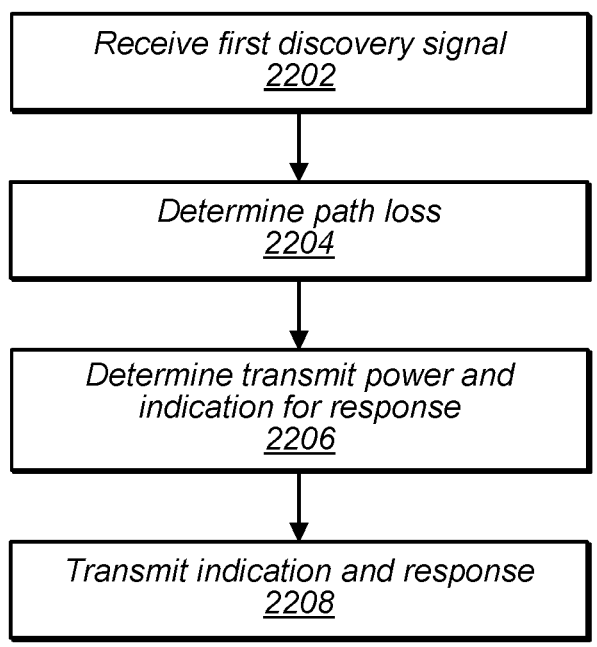
FIG. 22 is a flowchart diagram illustrating an example method for determining transmit power for a discovery response signal, according to some embodiments.

FIG. 22 is a flow chart depicting a method of transmission power control for discovery signaling. Such transmission power control may reduce the effects of the near-far problem, at least according to some embodiments.

In 2202, a first wireless device (UE 1) receives a first discovery signal from a second device (UE 2). The discovery message may be of any of the forms described previously herein, among other possibilities. The discovery message may be include and/or be associated with reference symbols (e.g., sounding reference signals (SRS), demodulation reference symbols (DM-RS), etc.). According to some embodiments, the first discovery message transmitted by a UE (e.g., UE 2) may be preceded by reference symbols (e.g., 1 subframe may be dedicated to reference symbols, such as SRS), e.g., to help with fine tuning the tracking loops (e.g., time tracking loop, frequency tracking loop, automatic gain control, etc.) if needed. According to some embodiments, a long cyclic prefix may be used in conjunction with some or all discovery transmissions.

Note that at least according to some embodiments, the first OFDM symbol (or first subframe) and the last OFDM symbol (or last subframe) of the discovery message may be left empty, e.g., in order to take into account propagation delay and the absence of any timing advance information.

In 2204, the first wireless device may determine the path loss associated with the discovery signal. The UE 1 may determine the path loss based at least in part on received power of reference symbols in combination with a maximum and/or expected transmission power (e.g. 30 dBm, among other possibilities) for the discovery signal. The maximum or expected transmission power may be known to UE 1 in advance or may be determined from cell characteristics (e.g., cell ID) or control signaling (e.g., MIB).

In 2206, the first wireless device may determine a transmit power and an indication of the transmit power to use for a response to UE 2. The transmit power may be determined so that the received power (e.g., at UE 2) of the response from UE 1 will be similar to the received power (e.g., at UE 2) of any other responses to UE 2. For example, a target receive power (e.g., based on the dynamic range of the receiver and/or any of various other possible considerations) may be defined (e.g., according to a D2D standard according to which UE1 and UE2 are communicating) or otherwise agreed upon in advance. The indication of the response transmit power may be explicit or may be implicit. For example, UE 1 may explicitly indicate the response transmit power in a message (e.g., providing functionality similar to a PDCCH in an LTE communication system) that may also include control signaling for link establishment, among various possibilities. Alternatively, the UE may implicitly indicate response transmit power by using scrambling sequences in conjunction with its reference symbols, e.g., such that each scrambling sequence corresponds to a range of transmission power. Alternatively, the UE may implicitly indicate response transmit power by using a cyclic redundancy check (CRC)-mask for the discovery sequence, e.g., such that the mask is a bitmap flag and each possible bitmap corresponds to a possible range of transmission power. This possibility is shown in more detail in FIG. 23 and described further below herein in conjunction therewith. Alternatively, the UE may implicitly indicate response transmit power by using specific time and/or frequency resources to transmit the response. Still other possible mechanisms for implicit indications are possible. Note that according to some embodiments, the indication of the transmit power may be an indication of a range of possible transmit powers within which the transmit power determined by the first wireless device falls.

In 2208, the first wireless device may transmit the response to UE 2, e.g., including the indication of the transmit power used, using the determined transmit power. Based on this indication, the first wireless device may be able to manage its transmit power control (e.g., adapt its power control loop) accordingly. For example, the transmit power used by the first wireless device may not be known in advance by the second wireless device, so providing an indication of the transmit power used (e.g., within a specified range, as supported according to the technique used to indicate the transmit power used) may allow the second wireless device to determine the path loss (e.g., as measured from the received power on the DM-RS and the transmit power indicated by the first wireless device), which may in turn be used for adapting the power control loop.

Note that according to some embodiments, the timing of the transmission of the response to UE 2 may depend at least in part on the determined transmit power. For example, in order to mitigate possible near-far effects, a number of different time slots/subframes could be reserved for different power levels. As one such possibility, all UEs responding to a given UE with a transmit power below a certain threshold (e.g., 15 dBm, as one possibility) could use a certain number (e.g., 32, as one possibility) of subframes after the original discovery message, while all UEs responding to a given UE with a transmit power above the threshold could use a certain number (e.g., 32, as one possibility) of subsequent subframes after the original discovery message. The parameters such as the number of power levels, thresholds between power levels, number of subframes for each group, etc., can be fixed or determined dynamically, as desired, e.g., based on the load (potential for collisions), latency, and/or any of various other possible considerations.

Figure 23:
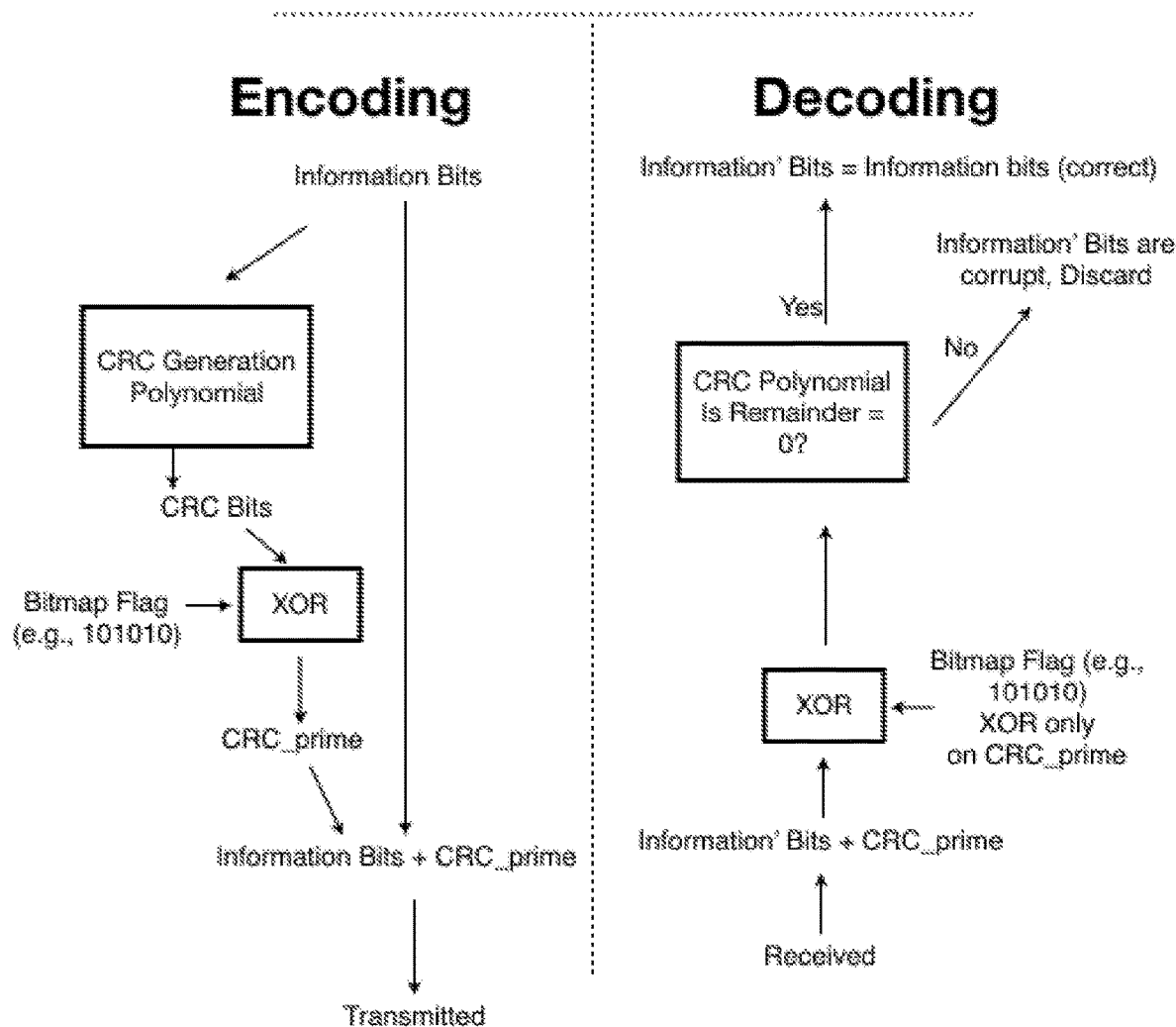
FIG. 23 illustrates an example technique for indicating a discovery response signal transmit power using a CRC mask, according to some embodiments.

FIG. 23 is a flow chart depicting a method of transmission power control management using a CRC mask, according to some embodiments.

A first UE (e.g., on the left side of the diagram) may encode information bits for a discovery signal. The first UE may generate a CRC polynomial based on the information bits of the discovery signal, and may generate CRC bits based on the polynomial. The first UE may add a bitmap flag to the CRC bits. A logical function (e.g., XOR or exclusive or) may be used to combine the bitmap flag with the CRC bits. The combination may be reversible. The bitmap flag may indicate the transmit power (e.g., or range of transmission power). The bitmap flag may be a string of bits (e.g., 101010, or any other desired string) of a defined length (e.g., including the same number of bits as are used in the CRC). The combined bitmap flag and CRC bits may be referred to as a CRC prime. The CRC prime and information bits may be transmitted.

A second UE (e.g., on the right side of the diagram) may receive the transmitted information bits and CRC prime. The second UE may use a logical function (e.g., XOR) to determine the bitmap flag from the CRC prime. The second UE may determine that a specific bitmap flag corresponds to a CRC polynomial with remainder equal to zero. If one such bitmap flag is found (e.g., the bitmap flag used by the first UE), the second UE may successfully decode the information bits and determine the transmission power based on the bitmap flag. Various other possible bitmap flags may not correspond to a zero remainder and therefore may not indicate the transmission power.

Figure 24:
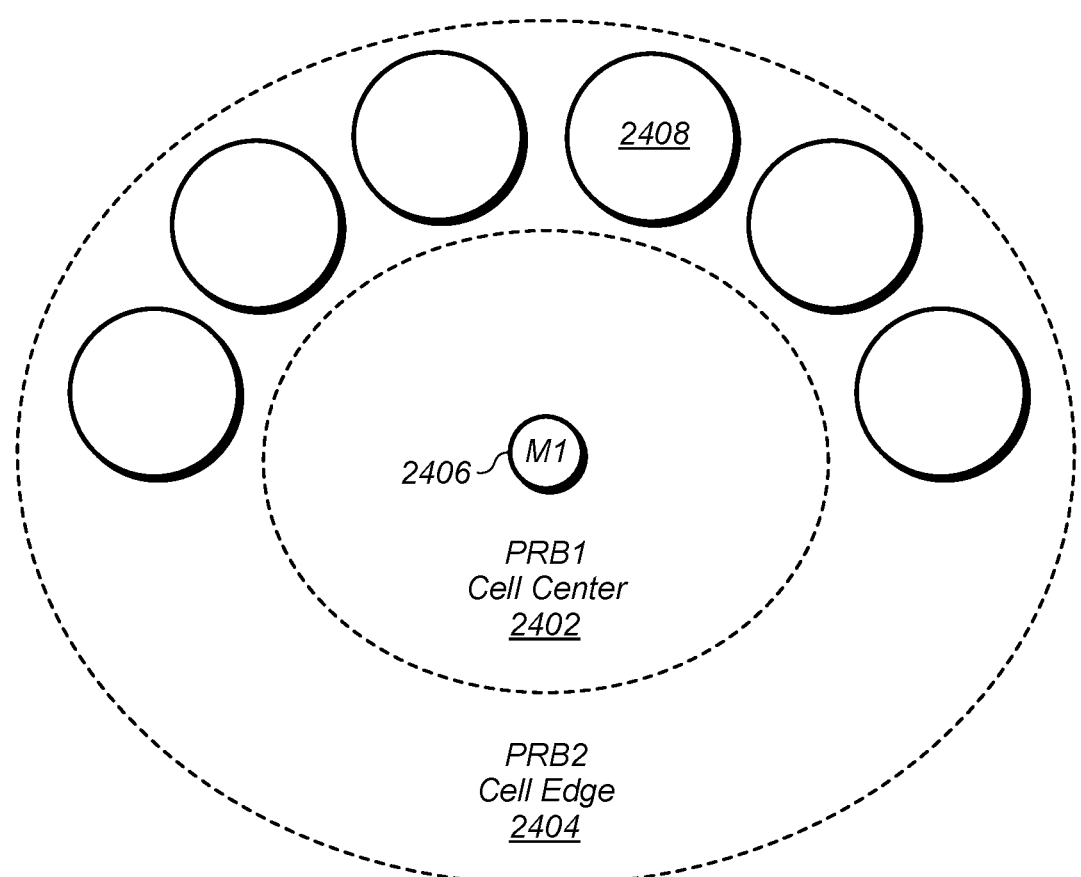
FIG. 24 illustrates aspects of an example scenario in which separate discovery resources may be used in different regions of a peer-to-peer communication group, according to some embodiments.

In some embodiments, separate discovery resources may be used in different regions of a D2D (e.g., OGRS) group. For example, FIG. 24 illustrates an embodiment wherein one PRB (e.g., PRB1) is used in the region shown as cell center 2402 and a second PRB (e.g., PRB2) is used for the cell edge 2404 region. Use of different PRBs for different regions may reduce the number of collisions between discovery signals, and therefore reduce latency. As shown, for low power (e.g., short range transmissions) transmissions in PRB1 and PRB2 may happen simultaneously. This may reduce the potential impact from the near/far problem, e.g., as in this case wireless devices may generally be consistently performing relatively low power communications and thus causing relatively low interference to other wireless devices. In some embodiments, for high power (e.g., long range) transmissions, transmissions may happen only in specific frequency resources (e.g., PRB1). In some instances, even in this case transmissions from the cell center may alternate with transmissions from cell edge in different time slots. Such a pattern may also reduce the near/far effect.

To enable such a configuration, the D2D group master 2406 (e.g., M1) may broadcast information about the discovery resources and the applicable regions. The regions may be defined in various ways. For example, a cell region may be defined based on physical/signal metrics (e.g., the received power of DM-RS) or based on location (e.g., a range of latitude/longitudes) among other possibilities.

Figure 25:
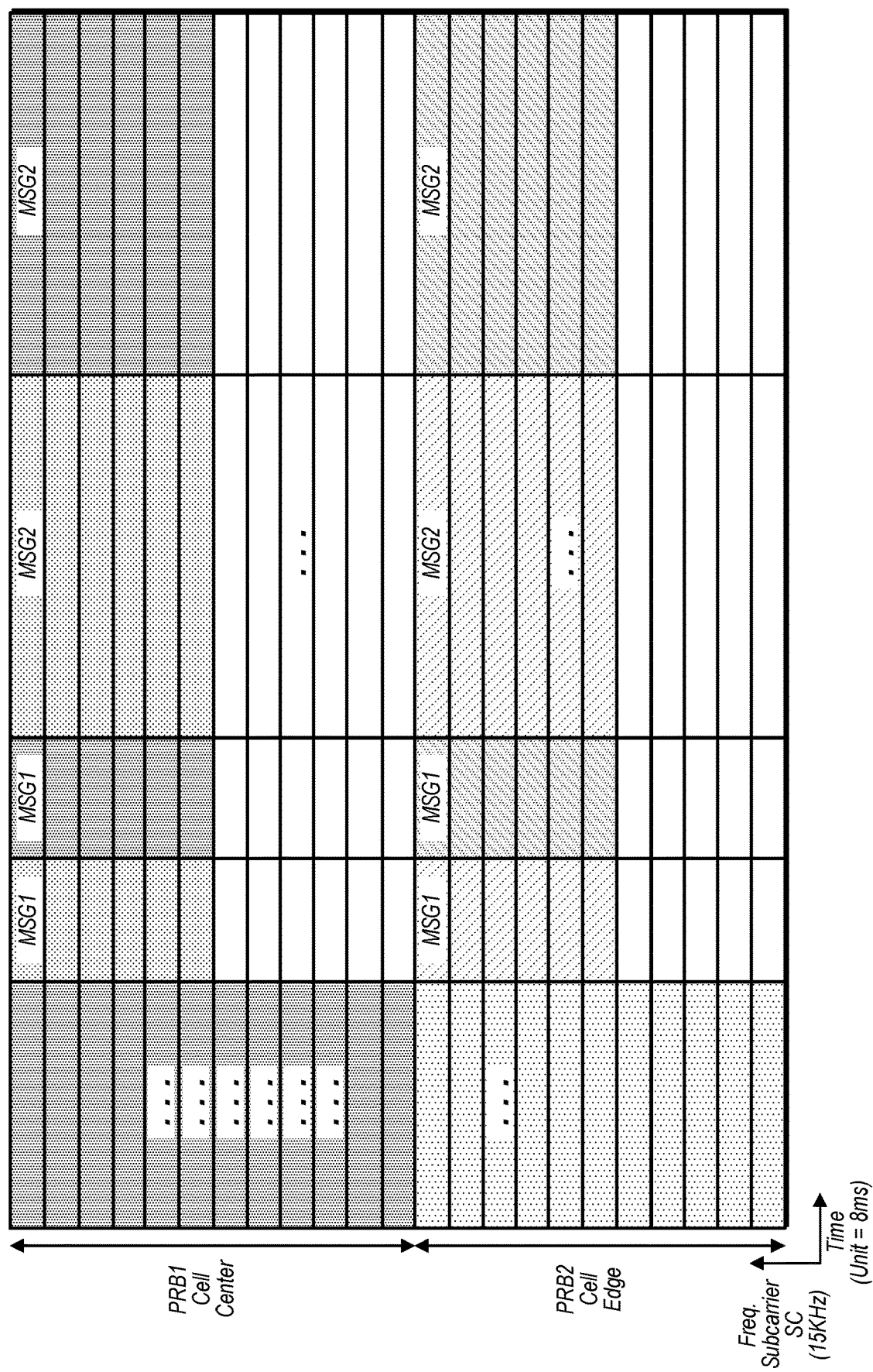
FIGS. 25-28 are time-frequency grids illustrating possible arrangements of discovery resources according to which separate discovery resources may be used in different regions of a peer-to-peer communication group, according to some embodiments.

FIG. 25 is a time-frequency grid illustrating a possible arrangement of resources for different regions, in which one set of frequency resources (e.g., PRB1) may be used for the cell center and another set of frequency resources (e.g., PRB2) may be used for the cell edge according to a possible discovery signal transmission schedule, and further illustrating possible responses to the discovery signals using the scheme. The illustrated example may be applicable for low power transmission, and may utilize 15 KHz subcarrier spacing with dedicated slots for initial discovery signals (e.g., MSG1) and responses (e.g., MSG2).

As shown, a set of subcarriers (e.g., 6 in each PRB, as shown, or any other desired number) may be used for each of MSG1*s* and MSG2*s*. The dedicated subcarriers may be used for transmitting discovery signals (e.g., MSG1) in both of the PRBs concurrently, e.g., depending on the location of the relevant UE or UEs.

In some embodiments, use of a low transmission power may add to flexibility in bandwidth and/or timing. For example, depending on the transmission power and the link budget requirement, the slot duration may be changed. Similarly, the number of subcarriers may depend, at least in part, on the link budget. For example, in some embodiments, 6 subcarriers may be used, with a subcarrier spacing of 15 KHz; such a spacing may reduce the duration of discovery messages. However, every UE ID may span all the subcarriers employed (e.g., no frequency multiplexing of MSG1 in a single PRB).

In some embodiments, MSG2 (e.g., discovery responses) may not be multiplexed on different subcarriers (e.g., when using 15 KHz slots and several (e.g., 6 or more) subcarriers) of the same timeslot. Instead, in such embodiments, one way to provide dedicated resources for multiple MSG2 replies for a single MSG1 (e.g., 8 ms in duration, among other possibilities) may be to have a longer MSG2 duration (e.g., 32 ms in duration, among other possibilities) and use time-domain multiplexing (e.g., as represented in the diagram by the greater width of MSG2 than MSG1). For example, UEs may be assigned response times within the MSG2 duration based on their UE-ID. Any of various techniques (e.g., a hashing function, as one possibility) may be used to map each device to its assigned dedicated time.

Alternatively, in some embodiments, MSG2 responses may be multiplexed in the same time resource unit in different PRBs and the duration of MSG2 may be equal to the duration of MSG1. In this case, multiple PRBs may be used for each of the various regions. Any of various techniques (e.g., a hashing function, as one possibility) may be used to map each device to its assigned dedicated PRB. Note that such an arrangement may require that a wireless device in the system be capable of receiving more than one PRB simultaneously (e.g., in order to receive all of the MSG2 responses to a MSG1 transmitted by the wireless device).

Note that while a pattern in which two time resource units are specified for MSG1 communication and two time resource units are specified for MSG2 communication in the illustrated example of FIG. 25, any number of other configurations (e.g., 1 time unit for MSG1, 1 time unit for MSG2; 3 time units for MSG1, 3 time units for MSG2; or any other desired configuration) are also possible.

Figure 26:
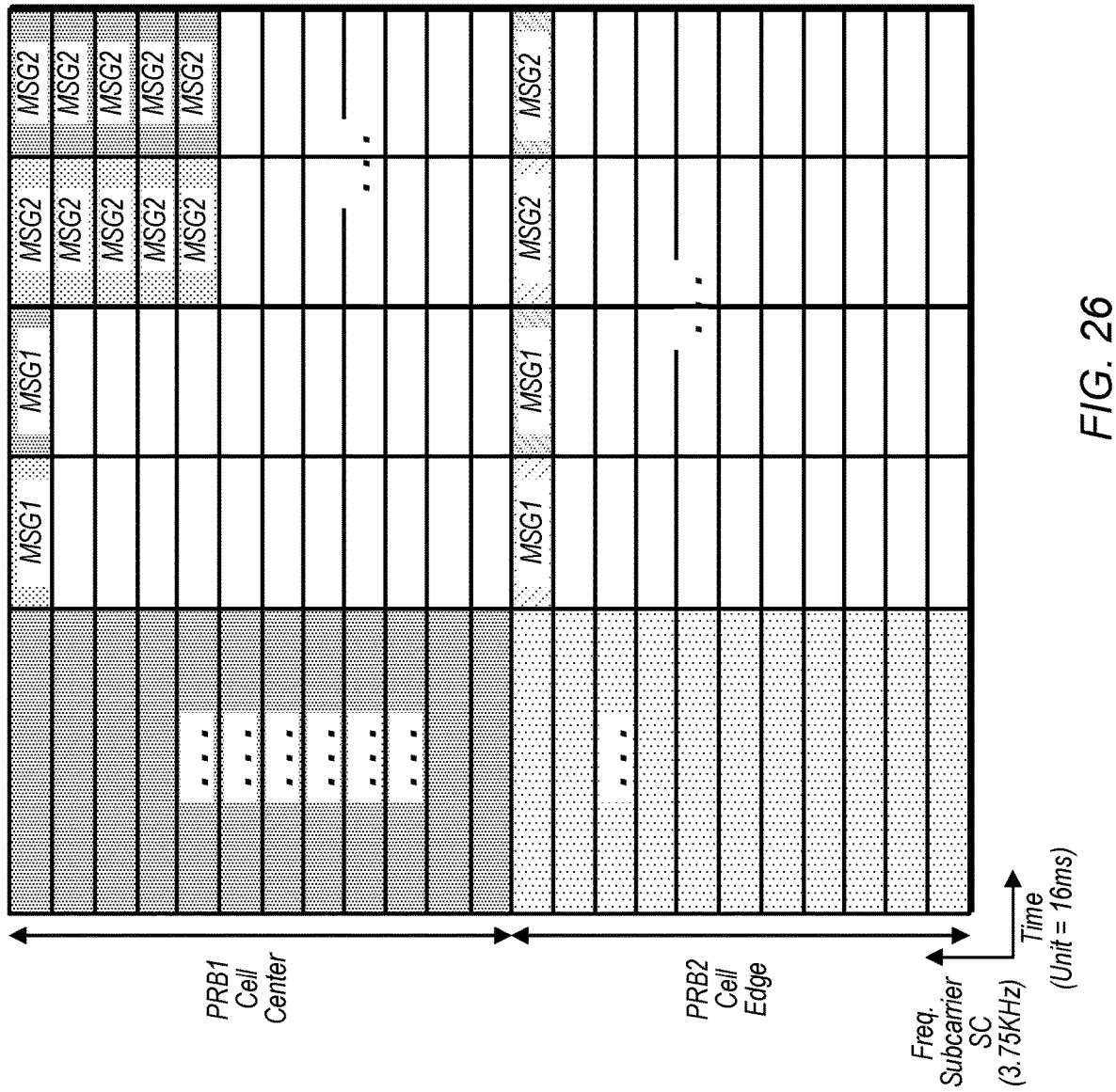

FIG. 26 is a time-frequency grid illustrating another possible arrangement of resources for different regions, in which one set of frequency resources (e.g., PRB1) may be used for the cell center and another set of frequency resources (e.g., PRB2) may be used for the cell edge according to a possible discovery signal transmission schedule, and further illustrating possible responses to the discovery signals using the scheme. The illustrated example may be applicable for low power transmission, and may utilize 3.75 KHz subcarrier spacing with dedicated slots for initial discovery signals (e.g., MSG1) and responses (e.g., MSG2).

As shown, a single subcarrier (e.g., in each PRB) may be used for MSG1 and multiple subcarriers for MSG2. Any number of subcarriers may be used for MSG2, and the number of subcarriers may be configured based on any desired considerations, such as the number of UEs (e.g., indicating number of likely responses). The dedicated subcarriers may be used for transmitting discovery signals (e.g., MSG1) in both of the PRBs concurrently, e.g., depending on the location of the relevant UE or UEs.

In some embodiments, MSG2 replies may be multiplexed to different, adjacent, 3.75 KHz subcarriers within the same time resource unit. The duration of MSG1 (e.g., 16 ms, among other possibilities) may be equal to the duration of MSG2. Thus, additional timeslots or PRBs may not be required for replies (e.g., MSG2), in this arrangement. Unused subcarriers may reduce interference (e.g., for MSG1).

Figure 27:
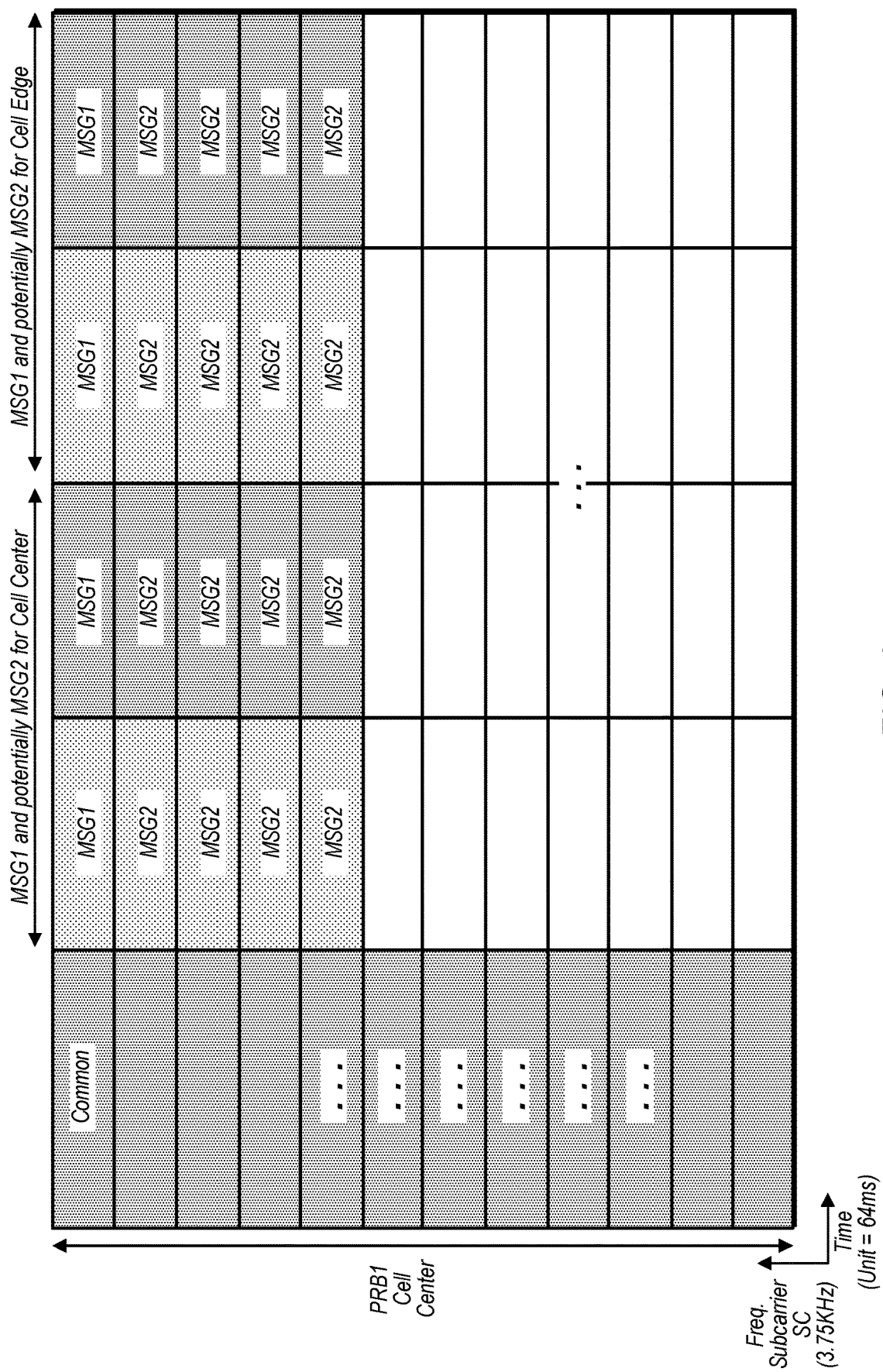

FIG. 27 is a time-frequency grid illustrating a possible arrangement of resources for high power transmission with 3.75 KHz subcarrier spacing and 64 ms time slots, which may be used for either or both of MSG1 or MSG2. As shown, a single PRB may be used for transmissions for all cell regions. In some embodiments, time domain multiplexing may be applied to allow separate regions to use separate time slots. In some embodiments, time domain multiplexing may not be applied and all cell regions may use the same resources. In some embodiments, the time slots may be of equal duration (e.g. 64 ms, among other possibilities).

In some embodiments, if there was a MSG1 in the slot before, then there may be no MSG1 in the current slot since MSG2 may happen (e.g., each slot is shared between MSG1/MSG2). In other words, if UE 1 sends a MSG1 in slot 1, then slot 2 may be reserved for other UEs to reply (e.g., MSG2). If no MSG1 is sent in slot 1, then MSG1 may be sent in slot 2. In the case that a MSG1 is sent in the second (e.g., the last) slot for a cell region, MSG2s may be sent in the first slot for that region at the next opportunity, e.g., at the next time slot reserved for discovery for that region. For example, if slots 1 and 2 are for the cell center, slots 3 and 4 are for the cell edge, and slots 5 and 6 are for the cell center, and a MSG1 is sent in slot 2 (e.g., the last slot for cell center at that time), then any MSG2 in response may be sent in slot 5 (e.g., the first slot of the next opportunity for cell center discovery). Alternatively, MSG2s may be sent in the next time slot after a MSG1 is sent regardless of the region in which the wireless device sending the MSG1 is located. Reusing time slots in this manner may offer efficiencies in the case of high power transmissions due to the longer time slots associated with the link budget. Accordingly, in some embodiments, if time slots are reserved for MSG2 even if there is no MSG1, significant resources may not be used. Also, in some embodiments, (e.g., if the UE distribution is relatively uniformly distributed, e.g., spatially), then fewer communications may occur in long range than short range. Thus, in some embodiments, contention for resources between MSG1 and MSG2 may be allowed, e.g., as illustrated.

Figure 28:
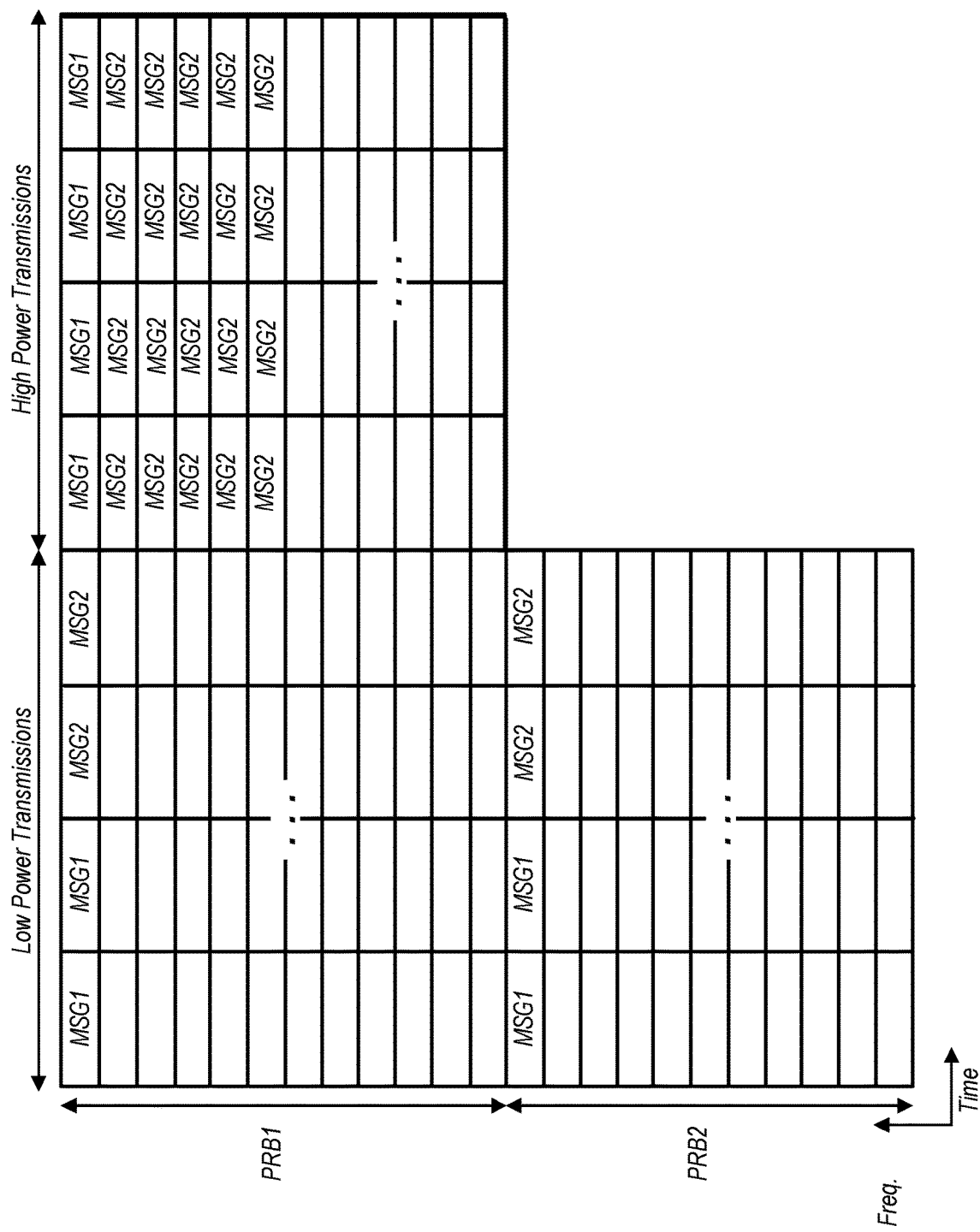

FIG. 28 is a time-frequency grid illustrating a possible arrangement of resources for alternating high power transmissions and low power transmissions. As shown, a number (e.g., 4, among other possibilities) of time slots may be reserved for low power transmissions, and then a number of time slots (e.g., 4, among other possibilities) may be reserved for high power transmissions. In some embodiments, additional subdivision of time slots (e.g., by region or other characteristics) (not shown) may be employed. This pattern may repeat, if desired. In some embodiments, low power transmissions may be used for discovery among UEs in close proximity, and high power transmissions may be used for UEs further apart. Low power transmissions may be used on different PRBs for the UEs in the cell center region (e.g., on PRB1) and the UEs in the cell edge region (e.g, on PRB2) respectively, while high power transmissions may be used on the same PRB (e.g, PRB1) for all UEs, as shown. Note that FIG. 28 illustrates while uniform time and frequency resource sizes between low power and high power resources, this is for simplicity of representation only, and different time (e.g., longer or shorter resource units) and/or frequency size denominations (e.g., wider or narrower subcarrier spacing) may be used for the different transmission power regimes, as desired.

Figure 29:
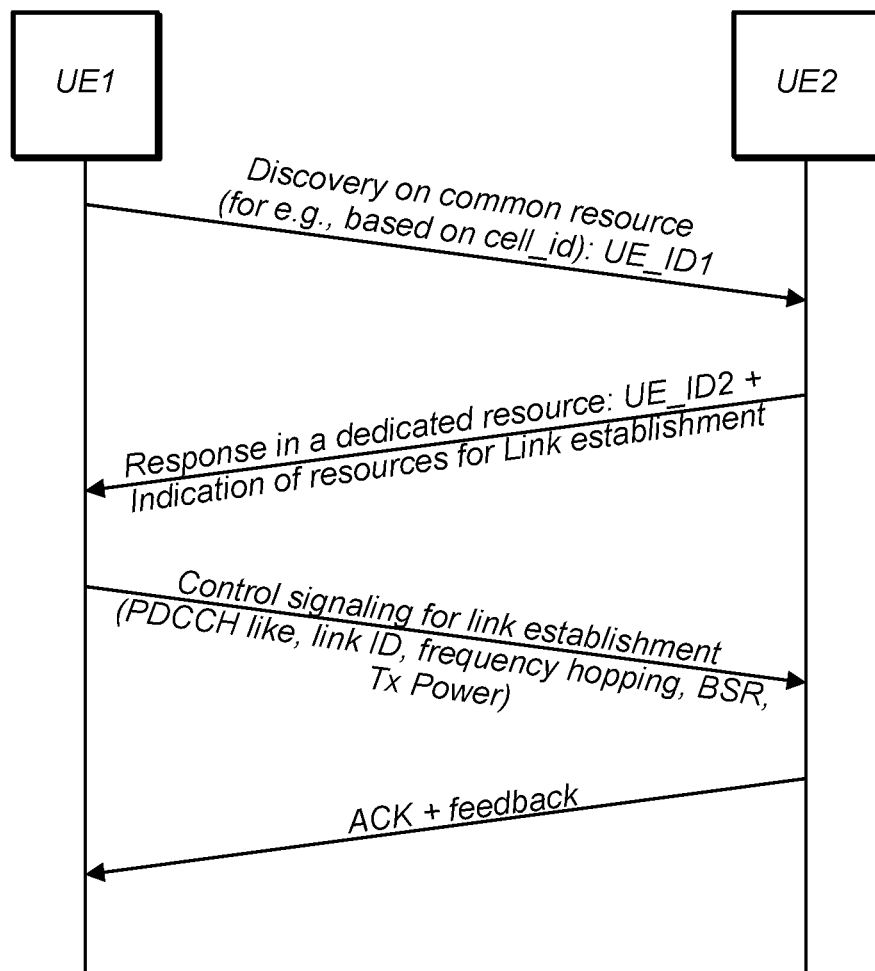
FIGS. 29-31 are communication flow diagrams illustrating further possible discovery signal flows, according to some embodiments.

FIG. 29 is a signal flow diagram illustrating a possible signal flow between a device providing its discovery signal and a device desiring to communicate with the device providing its discovery signal, similar to FIG. 19. FIG. 29 may correspond to a first use-case where the UE would like to discover all UEs in the vicinity (e.g., in the cell/group/region) and/or to communicate with multiple UEs. As illustrated, the transmitting device ("UE1") may provide its discovery signal on the common resources (e.g., subcarrier, time slot, PRB, power level, etc., according to any of the embodiments described herein). As one possibility, the discovery signal (e.g., MSG1) may include the UE ID (e.g., UE ID1) and may include 32 bits. Once the discovery signal is received by the receiving device(s) (e.g., including "UE2"), the receiving device(s) (e.g., including UE2) may use a dedicated resource (e.g., time slot, subcarrier, PRB, etc.) to respond (e.g., provide a MSG2) to the UE1. As one possibility, the response by each receiving device may include the UE ID of the receiving device (e.g., UE ID2 in the illustrated example) and may include 32 bits. The response may also indicate resources to be used by UE1 to establish the link (e.g., carrier frequency channel, PRB, time slot, SFN, etc.) and/or any other information to start the communication. Based on the MSG2, UE1 may provide control signaling (e.g., a MSG3, indicating link ID, frequency hopping parameters, TX power used, etc.) on the indicated resources, and the UE2 may respond with an acknowledgement (e.g., a MSG4) and possibly feedback.

Thus, in some embodiments, MSG1 and MSG2 may use dedicated time and frequency resources (e.g., according to the various embodiments described, among other possibilities) and later messages (e.g., MSG3 and MSG4) may use other resources (e.g., as negotiated in the link establishment).

Figure 30:
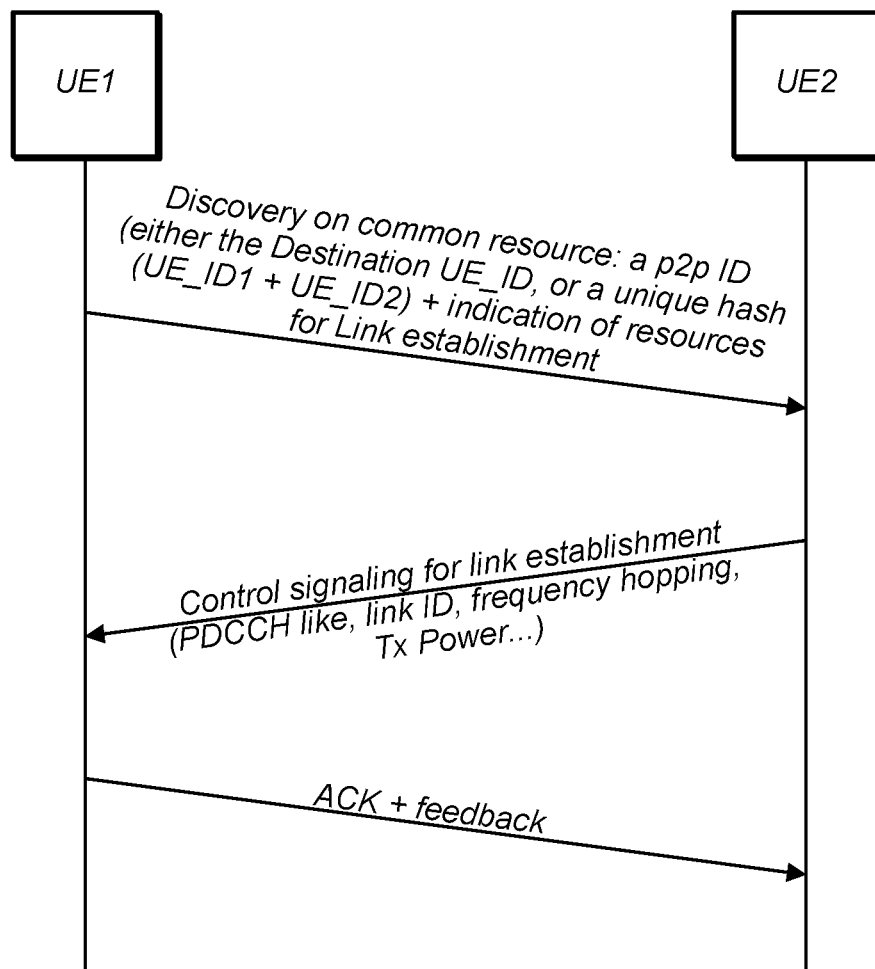

FIG. 30 is a signal flow diagram illustrating another possible signal flow between a device providing its discovery signal (e.g., MSG1) and a device desiring to communicate with the device providing its discovery signal, similar to FIG. 20. FIG. 30 may correspond to a second use-case wherein the UE would like to perform discovery with and/or to communicate with a single UE. As illustrated, the transmitting device ("UE 1") may provide its discovery signal on the common resources (e.g., subcarrier, time slot, PRB, power level, etc., according to any of the embodiments described herein). As one possibility, the discovery signal may include both the UE ID of the source (e.g., UE ID1) and of the destination (e.g., UE ID2). Thus, the size of the message may be 64 bits. This message size may have an impact on the link budget. Alternatively, the discovery signal may include the UE ID of the destination, or a unique hash (e.g., based on UE ID1 and UE ID2), such that the size of the message may be 32 bits. The message may also specify the resources that should be used by UE2 to establish the link (e.g., carrier frequency channel, PRB, time slot, SFN, etc.) and/or any other information to start the communication. Based on the MSG1, UE2 may provide control signaling (e.g., indicating link ID, frequency hopping parameters, TX power used, etc.) on the indicated resources, and the UE1 may respond with an acknowledgement and possibly feedback.

Thus, in some embodiments, the MSG1 may use dedicated time and frequency resources (e.g., according to the various embodiments described, among other possibilities) and later messages (e.g., MSG2 and MSG3) may use other resources (e.g., as negotiated in the link establishment).

Figure 31:
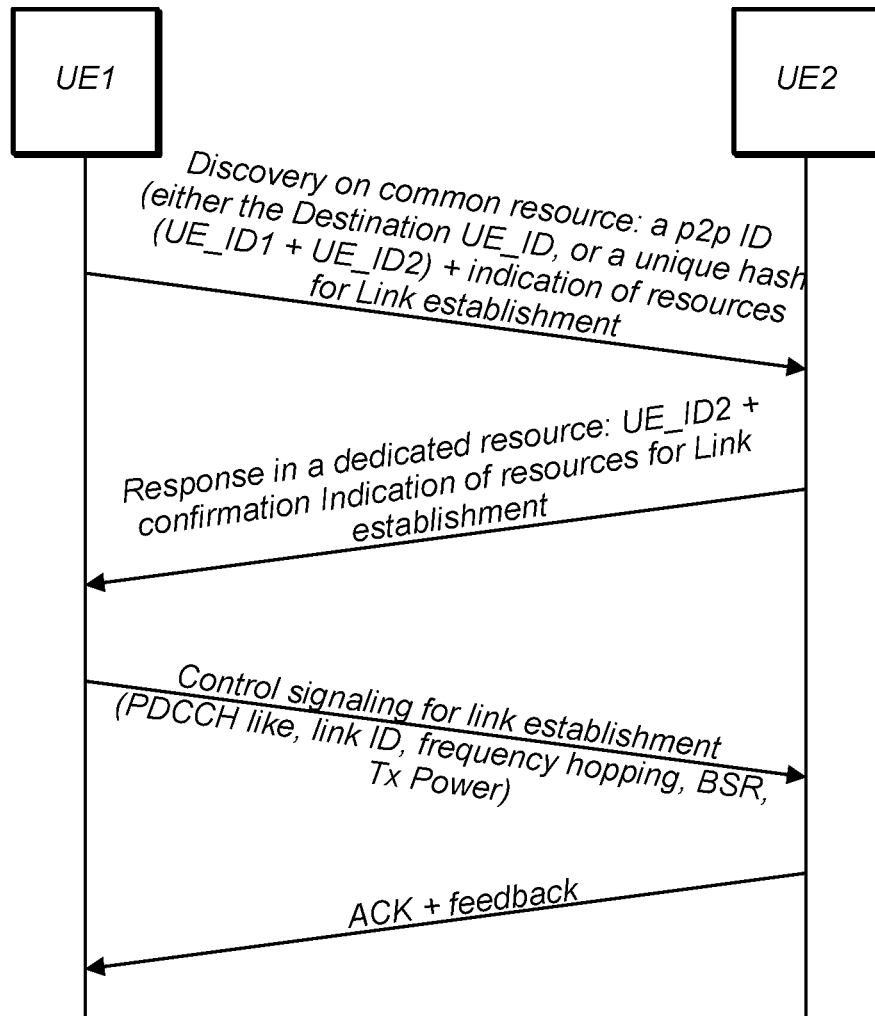

FIG. 31 is a signal flow diagram illustrating a possible signal flow between a device providing its discovery signal and a device desiring to communicate with the device providing its discovery signal, e.g., in a scenario in which the device providing the discovery signal wishes to perform discovery with a single UE (e.g., similar to the second use-case illustrated in FIGS. 20 and 30), further illustrating a possible resource usage framework for the signals exchanged in accordance with various embodiments. As illustrated, the transmitting device ("UE1") may provide its discovery signal (e.g., MSG1) on the common resources (e.g., subcarrier, time slot, PRB, power level, etc., according to any of the embodiments described herein). As one possibility, the discovery signal may include both the UE ID of the source (e.g., UE ID1) and of the destination (e.g., UE ID2). Thus, the size of the message may be 64 bits. This message size may have an impact on the link budget. Alternatively, the discovery signal may include the UE ID of the destination, or a unique hash (e.g., based on UE ID1 and UE ID2), such that the size of the message may be 32 bits. Once the discovery signal is received by the destination device (e.g., "UE2", as shown), and the device is intending to establish communication with the UE1, the UE2 may use a dedicated resource to respond to the UE1 (e.g., MSG2). The dedicated resource may be assigned to the UE2 based on its UE ID and/or any of the various considerations described herein.

In some embodiments, either MSG1 or MSG2 may include an indication of resources to use for link establishment (e.g., carrier frequency channel, PRB, time slot, SFN, etc.). The MSG3, which may include control signaling for link establishment, may thus be started by either UE1 or by UE2.

At least in some instances, it may be preferable to utilize such a four-message pattern (e.g., as illustrated in FIG. 31) even if it may be possible to use a three-message pattern (e.g., as illustrated in FIG. 30), e.g., in order to keep the procedure symmetric for both use cases (e.g., peer-to-peer or presence). In such embodiments, the indication of resources to use for link establishment may be included in MSG2 and sent by UE2, and the control signaling and link establishment may be included in the third message (e.g., MSG3), which may be sent by UE1.

Thus, in some embodiments, MSG1 and MSG2 may use dedicated time and frequency resources (e.g., according to the various embodiments described, among other possibilities) and later messages (e.g., MSG3 and MSG4) may use other resources (e.g., as negotiated in the link establishment).

In the following further exemplary embodiments are provided.

One set of embodiments may include a method, comprising: by a first wireless device: obtaining synchronization with an off grid radio service (OGRS) group; and performing peer-to-peer discovery in the OGRS group, wherein the peer-to-peer discovery is performed using a plurality of frequency channels following a repeating frequency hopping pattern in each of a plurality of discovery cycles, wherein each discovery cycle further comprises a plurality of discovery windows, wherein performing peer-to-peer discovery further comprises transmitting a discovery signal on a common subcarrier during a specified portion of each discovery window.

According to some embodiments, performing peer-to-peer discovery further comprises, during a portion of each discovery window following the specified portion during which the first wireless device transmits the discovery signal on the common subcarrier: receiving one or more responses to the discovery signal transmitted by the first wireless device from one or more other wireless devices on dedicated subcarriers specific to the one or more other wireless devices in the same time unit According to some embodiments, performing peer-to-peer discovery further comprises, during portions of each discovery window other than the specified portion during which the first wireless device transmits the discovery signal on the common subcarrier: receiving discovery signals from one or more other wireless devices on the common subcarrier.

According to some embodiments, performing peer-to-peer discovery further comprises: responding to a discovery signal transmitted by a second wireless device using a dedicated subcarrier assigned to the first wireless device.

According to some embodiments, responding to the discovery signal transmitted by the second wireless device is performed at a time configured to indicate that the response is intended for the second wireless device.

According to some embodiments, the discovery signal transmitted by the second wireless device comprises an indication that the discovery signal is intended only for the first wireless device, wherein responding to the discovery signal transmitted by the second wireless device further comprises: transmitting control signaling for configuring a data communication channel between the first wireless device and the second wireless device based at least in part on the indication that the discovery signal is intended only for the first wireless device.

According to some embodiments, the discovery signal transmitted by the second wireless device comprises an indication that the discovery signal is intended for all wireless devices in the OGRS group, wherein responding to the discovery signal transmitted by the second wireless device further comprises: transmitting an indication of a UE identifier of the first wireless device to the second wireless device based at least in part on the indication that the discovery signal is intended for all wireless devices in the OGRS group.

According to some embodiments, the method further comprises: determining a transmit power used for responding to the discovery signal transmitted by the second wireless device, wherein the transmit power used for responding to the discovery signal transmitted by the second wireless device is determined based at least in part on a received power of the discovery signal transmitted by the second wireless device and a transmit power of the discovery signal transmitted by the second wireless device, wherein responding to the discovery signal transmitted by the second wireless device is performed using the determined transmit power.

According to some embodiments, responding to the discovery signal transmitted by the second wireless device further comprises: providing an indication of the determined transmit power.

According to some embodiments, the indication is provided using one of: an explicit indication using one or more bits configured to indicate the determined transmit power; an implicit indication based on a scrambling sequence used on reference symbols provided by the first wireless device; an implicit indication based on a cyclic redundancy check (CRC) mask applied to a CRC provided by the first wireless device; or an implicit indication based on time and/or frequency resources used to respond to the discovery signal transmitted by the second wireless device.

According to some embodiments, performing peer-to-peer discovery further comprises: determining that a second wireless device is assigned a same dedicated subcarrier as the first wireless device; and responding to a discovery signal transmitted by the second wireless device using a dedicated subcarrier configured for use if a dedicated subcarrier is assigned to both a wireless device transmitting a discovery signal and a wireless device responding to the discovery signal based at least in part on determining that the second wireless device is assigned the same dedicated subcarrier as the first wireless device.

According to some embodiments, the common subcarrier and the dedicated subcarriers have a subcarrier spacing of 3.75 kHz.

According to some embodiments, the discovery signal comprises a modified third generation partnership project (3GPP) sidelink discovery message, wherein the discovery signal comprises a reduced payload in comparison to a 3GPP sidelink discovery message.

According to some embodiments, the modified 3GPP sidelink discovery message comprises a group ID field and a UE ID field.

According to some embodiments, the modified 3GPP sidelink discovery message comprises a UE ID field, wherein the modified 3GPP sidelink discovery message does not include a group ID field.

According to some embodiments, the discovery signal comprises a code selected as a UE ID from a plurality of orthogonal codes.

According to some embodiments, the discovery signal is a predetermined length.

According to some embodiments, the discovery signal is configured to cause all wireless devices in the OGRS group to reply.

According to some embodiments, the discovery signal is configured to cause a specific wireless device in the OGRS group to reply.

Another set of embodiments may include a method, comprising: by a first wireless device: obtaining synchronization with an off grid radio service (OGRS) group; determining a location of the first wireless device within the OGRS group based at least in part on signal strength of a synchronization signal used to obtain synchronization with the OGRS group; and performing peer-to-peer discovery in the OGRS group, wherein time and frequency resources used by the first wireless device to perform the peer-to-peer discovery in the OGRS group are determined based at least in part on the location of the first wireless device within the OGRS group.

According to some embodiments, determining the location of the first wireless device within the OGRS group further comprises: determining that the first wireless device is in a cell center portion of the OGRS group if the signal strength of the synchronization signal used to obtain synchronization with the OGRS group is above a signal strength threshold; and determining that the first wireless device is in a cell edge portion of the OGRS group if the signal strength of the synchronization signal used to obtain synchronization with the OGRS group is below the signal strength threshold.

According to some embodiments, during first periods of time, the first wireless device performs the peer-to-peer discovery using a first physical resource block (PRB), wherein use of the first PRB by the first wireless device during the first periods of time is based at least in part on the location of the first wireless device within the OGRS group, wherein during the first periods of time, wireless devices in a different location within the OGRS group than the first wireless device perform peer-to-peer discovery using a second PRB.

According to some embodiments, during second periods of time, all wireless devices in the OGRS group use a same PRB to perform peer-to-peer discovery.

According to some embodiments, the first periods of time alternate with the second periods of time in a predetermined manner.

According to some embodiments, performing peer-to-peer discovery in the OGRS group further comprises: transmitting a discovery signal using one or more time-frequency resources determined based at least in part on the location of the first wireless device within the OGRS group and further based at least in part on a wireless device identifier of the first wireless device; receiving a discovery response signal from a second wireless device in response to the discovery signal using one or more time-frequency resources determined based at least in part on the location of the second wireless device within the OGRS group and further based at least in part on a wireless device identifier of the second wireless device; transmitting control signaling for link establishment to the second wireless device in response to the discovery response signal, wherein the control signaling for link establishment is transmitted using one or more time-frequency resources determined based at least in part on an indication provided in one of the discovery signal or the discovery response signal; and receiving an acknowledgement from the second wireless device in response to the control signaling for link establishment.

A still further exemplary set of embodiments may include an apparatus, comprising a processing element configured to cause a device to implement any or all parts of the preceding examples.

Another exemplary set of embodiments may include a wireless device, comprising: an antenna; a radio coupled to the antenna; and a processing element operably coupled to the radio, wherein the device is configured to implement any or all parts of the preceding examples.

A yet further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A first user equipment device (UE), comprising:
an antenna;
a radio operably coupled to the antenna; and
a processor operably coupled to the radio and configured to cause the first UE to:
receive, from a master UE, a broadcast including information about sidelink discovery resources;
determine a distance of the first UE from the master UE;
select, based on the information about sidelink discovery resources and the distance of the first UE from the master UE, discovery resources for a sidelink discovery signal; and
transmit the sidelink discovery signal on the discovery resources.

2. The first UE of claim 1, wherein the processor is further configured to cause the first UE to:
receive, from the master UE, a reference signal; and
determine a received power of the reference signal, wherein determining the distance of the UE from the master UE is based on the received power.

3. The first UE of claim 1, wherein the distance of the first UE from the master UE is determined based on a range of latitude and longitudes.

4. The first UE of claim 1, wherein the information about sidelink discovery resources indicates a first physical resource block (PRB) associated with a first region and a second PRB associated with a second region.

5. The first UE of claim 1, wherein the discovery resources for the sidelink discovery signal are determined further based on an identifier of the first UE.

6. The first UE of claim 1, wherein the processor is further configured to cause the first UE to:
receive, from a second UE, a sidelink discovery response signal on resources based at least in part on a location of the second UE.

7. The first UE of claim 6, wherein the processor is further configured to cause the first UE to:
transmit control signaling for link establishment to the second UE in response to the sidelink discovery response signal, wherein the control signaling for link establishment is transmitted using one or more time-frequency resources determined based at least in part on an indication provided in one of the sidelink discovery signal or the sidelink discovery response signal.

8. A method, comprising:
at a first user equipment device (UE):
synchronizing with a sidelink communication group;
determining a location of the first UE relative to the sidelink communication group; and
selecting resources for sidelink discovery based on the location of the first UE relative to the sidelink communication group.

9. The method of claim 8, the method further comprising:
receiving a discovery signal from a second UE; and
determining second resources to transmit a discovery response signal to the second UE, wherein the second resources indicate that the discovery response signal is directed to the second UE based on a hash of an identifier of the second UE.

10. The method of claim 9, wherein the second resources further indicate that the discovery response signal is from the first UE.

11. The method of claim 8, the method further comprising:
    transmitting a discovery signal; and
    receiving a response to the discovery signal transmitted from a second UE on a dedicated subcarrier specific to the second UE.

12. The method of claim 11, wherein the dedicated subcarrier specific to the second UE is associated with an identifier of the second UE.

13. The method of claim 8, the method further comprising:
    transmitting a discovery signal on a physical resource block selected based on a hash of an identifier of the first UE.

14. The method of claim 8, wherein determining location of the first UE relative to the sidelink communication group comprises estimating a distance between the first UE and a master UE of the sidelink communication group.

15. An apparatus, comprising:
    a processor configured to cause a first user equipment device (UE) to:
        receive, from a master UE, a broadcast including information about sidelink discovery resources;
        determine a distance of the first UE from the master UE;
        select, based on the information about sidelink discovery resources and the distance of the first UE from the master UE, discovery resources for a sidelink discovery signal; and
        transmit the sidelink discovery signal on the discovery resources.

16. The apparatus of claim 15, wherein the processor is further configured to cause the first UE to:
    receive, from the master UE, a reference signal; and
    determine a received power of the reference signal, wherein determining the distance of the UE from the master UE is based on the received power.

17. The apparatus of claim 15, wherein the distance of the first UE from the master UE is determined based on a range of latitude and longitudes.

18. The apparatus of claim 15, wherein the information about sidelink discovery resources indicates a first physical resource block (PRB) associated with a first region and a second PRB associated with a second region.

19. The apparatus of claim 15, wherein the discovery resources for the sidelink discovery signal are determined further based on an identifier of the first UE.

20. The apparatus of claim 15, wherein the processor is further configured to cause the first UE to:
    receive, from a second UE, a sidelink discovery response signal on resources based at least in part on a location of the second UE.

* * * * *